US006480901B1

(12) United States Patent
Weber et al.

(10) Patent No.: US 6,480,901 B1
(45) Date of Patent: Nov. 12, 2002

(54) SYSTEM FOR MONITORING AND MANAGING DEVICES ON A NETWORK FROM A MANAGEMENT STATION VIA A PROXY SERVER THAT PROVIDES PROTOCOL CONVERTER

(75) Inventors: Bret S. Weber, Wichita; Rodney A. DeKoning, Augusta; William P. Delaney; Ray M. Jantz, both of Wichita, all of KS (US); William V. Courtright, II, Pittsburgh, PA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/350,515

(22) Filed: Jul. 9, 1999

(51) Int. Cl.$^7$ ............................................. G06F 15/16
(52) U.S. Cl. ..................................... 709/246; 709/223
(58) Field of Search .............................. 709/223, 225, 709/230, 246, 212, 201, 240; 710/18, 1, 302; 711/114; 714/5; 370/362

(56) References Cited

U.S. PATENT DOCUMENTS

| | | | |
|---|---|---|---|
| 4,167,041 A | 9/1979 | Curlander et al. | 364/900 |
| 4,872,167 A | 10/1989 | Maezawa et al. | 371/19 |
| 5,005,119 A | 4/1991 | Rumbaugh et al. | 364/200 |
| 5,005,122 A | 4/1991 | Griffin et al. | 364/200 |
| 5,021,948 A | 6/1991 | Nakayama et al. | 364/200 |
| 5,109,486 A | 4/1992 | Seymour | |
| 5,123,017 A | 6/1992 | Simpkins et al. | 371/15.1 |
| 5,237,689 A | 8/1993 | Behnke | 395/700 |
| 5,369,778 A | 11/1994 | Soucie et al. | 395/800 |
| 5,392,244 A | 2/1995 | Jacobson et al. | 365/200 |
| 5,394,522 A | 2/1995 | Sanchez-Frank et al. | 395/159 |
| 5,446,888 A | 8/1995 | Pyne | |
| 5,471,675 A | 11/1995 | Zias | |
| 5,473,772 A | 12/1995 | Halliwell et al. | 395/650 |

(List continued on next page.)

OTHER PUBLICATIONS

20010052006—Author(s)—Barker et al.

20020002607—Author(s)—Ludovici et al.

Network Management RFCs Sorted by Topic; http://wwws-nmp.cs.utwente.nl/Docs/ietf/rfc/rfcbytopic.shtml.

Disk Drive with Embedded Hyper—Text Markup Language Server; IBM TDB, vol. 38, n12,–1295, p479.

(List continued on next page.)

*Primary Examiner*—Le Hien Luu
(74) *Attorney, Agent, or Firm*—Townsend and Townsend and Crew, L.L.P.

(57) ABSTRACT

A system and method for monitoring and managing devices on a network. The system and method preferably comprises a proxy server connected to the network and a managed device connected to the proxy server. The system further comprises storage means for storing a device management application program associated with the managed device, and a management station in communication with the managed device via the proxy server and in communication with the storage means. The management station preferably is configured to retrieve the device management application program from the storage means and process the device management application program. As the management station processes the device management application program, the management station is able to monitor and manage the managed device. In particular, the management station can send management commands to a controller of the managed device via the proxy server, and the management station can receive notifications from the managed device, also via the proxy server.

2 Claims, 13 Drawing Sheets

U.S. PATENT DOCUMENTS

| | | | |
|---|---|---|---|
| 5,491,796 A | 2/1996 | Wanderer et al. | 395/200.09 |
| 5,499,357 A | 3/1996 | Sonty et al. | 395/500 |
| 5,504,921 A | 4/1996 | Dev et al. | 395/800 |
| 5,522,042 A | 5/1996 | Fee et al. | 395/200.1 |
| 5,546,558 A | 8/1996 | Jacobson et al. | 395/441 |
| 5,548,722 A | 8/1996 | Jalalian et al. | 395/200.1 |
| 5,561,769 A | 10/1996 | Kumar et al. | 395/200.05 |
| 5,568,471 A | 10/1996 | Hershey et al. | 370/17 |
| 5,581,724 A | 12/1996 | Belsan et al. | 395/441 |
| 5,603,027 A | 2/1997 | Ohkami | 395/619 |
| 5,606,669 A | 2/1997 | Bertin et al. | 395/200.15 |
| 5,613,060 A | 3/1997 | Britton et al. | 395/182.13 |
| 5,625,818 A | 4/1997 | Zarmer et al. | 395/615 |
| 5,630,081 A | 5/1997 | Rybicki et al. | 395/348 |
| 5,632,027 A | 5/1997 | Martin et al. | 395/497.01 |
| 5,634,009 A | 5/1997 | Iddon et al. | 395/200.11 |
| 5,634,010 A | 5/1997 | Ciscon et al. | 395/200.15 |
| 5,634,011 A | 5/1997 | Auerbach et al. | 395/200.15 |
| 5,654,901 A | 8/1997 | Boman | 395/712 |
| 5,655,081 A | 8/1997 | Bonnell et al. | 395/200.32 |
| 5,666,293 A | 9/1997 | Metz et al. | 395/200.5 |
| 5,666,534 A | 9/1997 | Gilbert et al. | 395/651 |
| 5,668,944 A | 9/1997 | Berry | 395/184.01 |
| 5,678,006 A | 10/1997 | Valizadeh et al. | 395/200.02 |
| 5,682,328 A | 10/1997 | Roeber et al. | 395/550 |
| 5,684,967 A | 11/1997 | McKenna et al. | 395/329 |
| 5,684,984 A | 11/1997 | Jones et al. | 395/610 |
| 5,694,581 A | 12/1997 | Cheng | 395/500 |
| 5,699,518 A | 12/1997 | Held et al. | 395/200.11 |
| 5,706,455 A | 1/1998 | Benton et al. | 395/348 |
| 5,706,508 A | 1/1998 | Chen et al. | 395/616 |
| 5,724,506 A | 3/1998 | Cleron et al. | 395/200.01 |
| 5,724,509 A | 3/1998 | Starkweather et al. | 395/200.5 |
| 5,727,181 A | 3/1998 | Beglin et al. | 395/441 |
| 5,732,275 A | 3/1998 | Kullick | |
| 5,742,762 A | 4/1998 | Scholl | |
| 5,748,881 A | 5/1998 | Lewis | |
| 5,784,702 A | 7/1998 | Greenstein et al. | |
| 5,862,333 A | 1/1999 | Graf | |
| 5,892,916 A | 4/1999 | Gehlhaar et al. | |
| 6,078,990 A * | 6/2000 | Frazier | 711/114 |
| 6,098,128 A | 8/2000 | Velez-McCaskey et al. | |
| 6,101,508 A | 8/2000 | Wolff | |
| 6,105,089 A * | 8/2000 | Chari et al. | 710/18 |
| 6,105,147 A | 8/2000 | Molloy | |
| 6,112,237 A | 8/2000 | Donaldson et al. | |
| 6,173,374 B1 * | 1/2001 | Heil et al. | 709/212 |
| 6,192,402 B1 | 2/2001 | Iwase | |
| 6,219,693 B1 * | 4/2001 | Napolitano et al. | 709/201 |
| 6,223,234 B1 * | 4/2001 | MahalingaM | 710/1 |
| 6,243,829 B1 * | 6/2001 | Chan | 714/5 |
| 6,247,080 B1 * | 6/2001 | Wallach et al. | 710/302 |
| 6,272,537 B1 | 8/2001 | Kekic et al. | |
| 6,333,929 B1 * | 12/2001 | Drottar et al. | 370/362 |
| 6,347,398 B1 | 2/2002 | Parthasarathy | |

OTHER PUBLICATIONS

Common User Access Advanced Interface Design Guide; IBM System Application Architecture.

Web–Based Management; http://www.3com.com/technology/tech_net/white_papers/500627.html.

Latin: Legacy Adapter to Internet; http://www.snmp.com/latin.html.

Web–Based Entrprise Management Initiative; http://wbem.freerange.com.

The Source for Java Technology;http://java.sun.com/products/JavaManagement/.

Next Java jolt: Management; wysiwyg://16/http://www8.zdnet.com/pcweek/news/0714/14man.html.

IBM Java Web–Based Network Management; pp. 1–7.

Outback Resource Group, Inc.; Bridging the Gap Between Today's Reality and Tomorrow's Technology; http;//192.135.184.58/products/jump/architecture.html.

Outback Resource Group, Inc; Bridging the Gap Between Today's Reality and Tomorrow's Technology; http://192.135.184.58/products/jump/faq.html.

Outback Resource Group, Inc; Bridging the Gap Between Today's Reality and Tomorrow's Technology; http://192.135.184.58/products.jump/intro.html.

Outback Resource Group, Inc; Bridging the Gap Between Today's Reality and Tomorrow's Technology; http://192.135.184.58/products/jump/workshop.html.

Outback Resource Group, Inc; Bridging the Gap Between Today's Reality and Tomorrow's Technology; http://192.135.184.58/products/jump/jms.html.

Outback Resource Group, Inc; Bridging the Gap Between Today's Reality and Tomorrow's Technology; http://192.135.184.58/products/jump/bui.html.

* cited by examiner

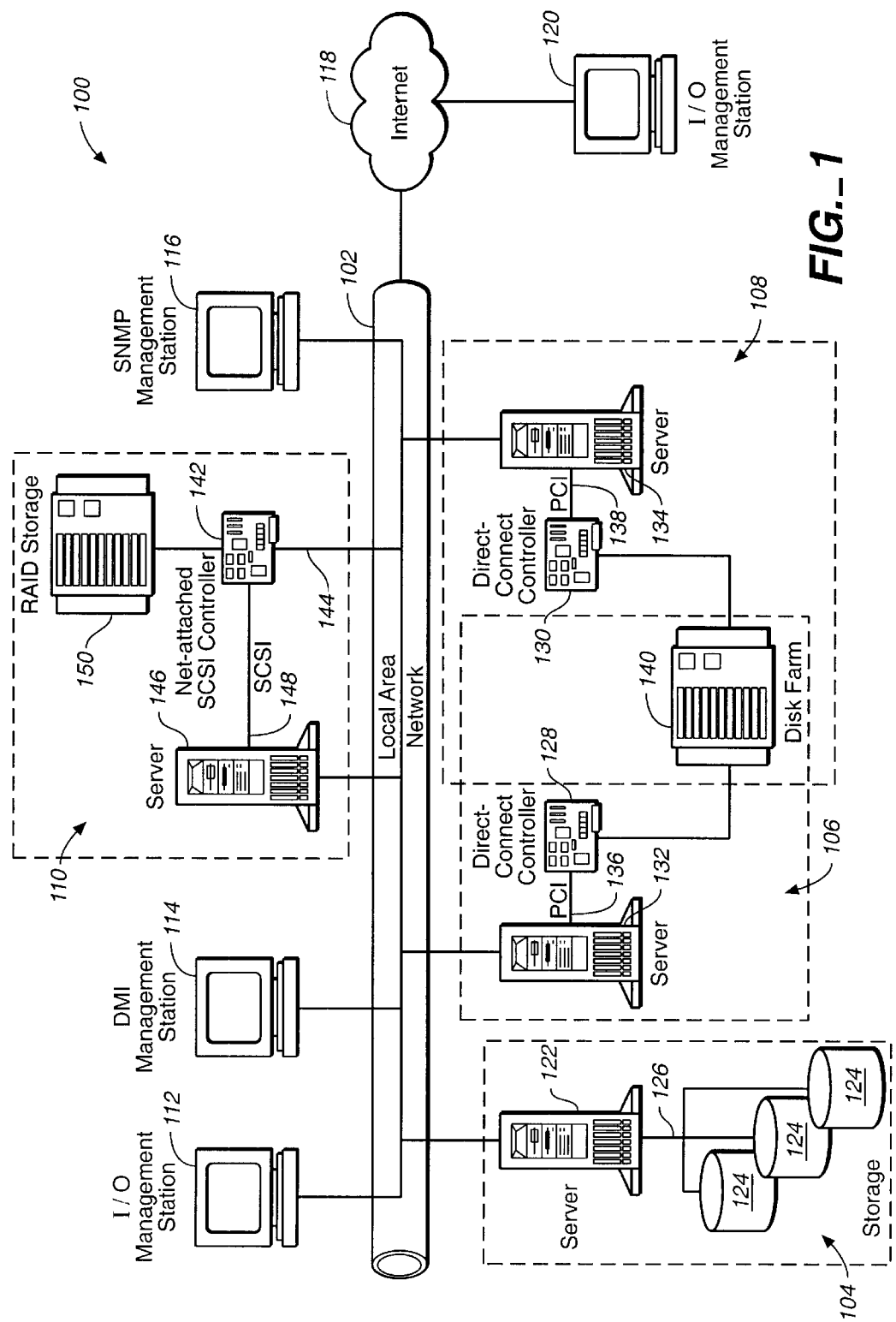

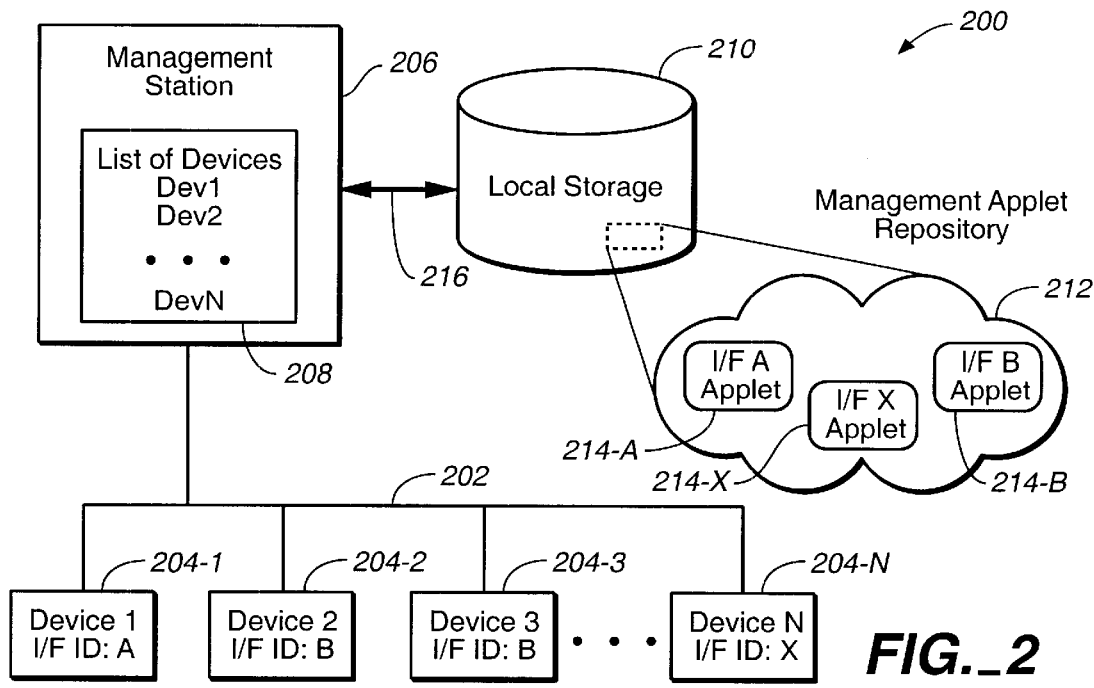
FIG._2
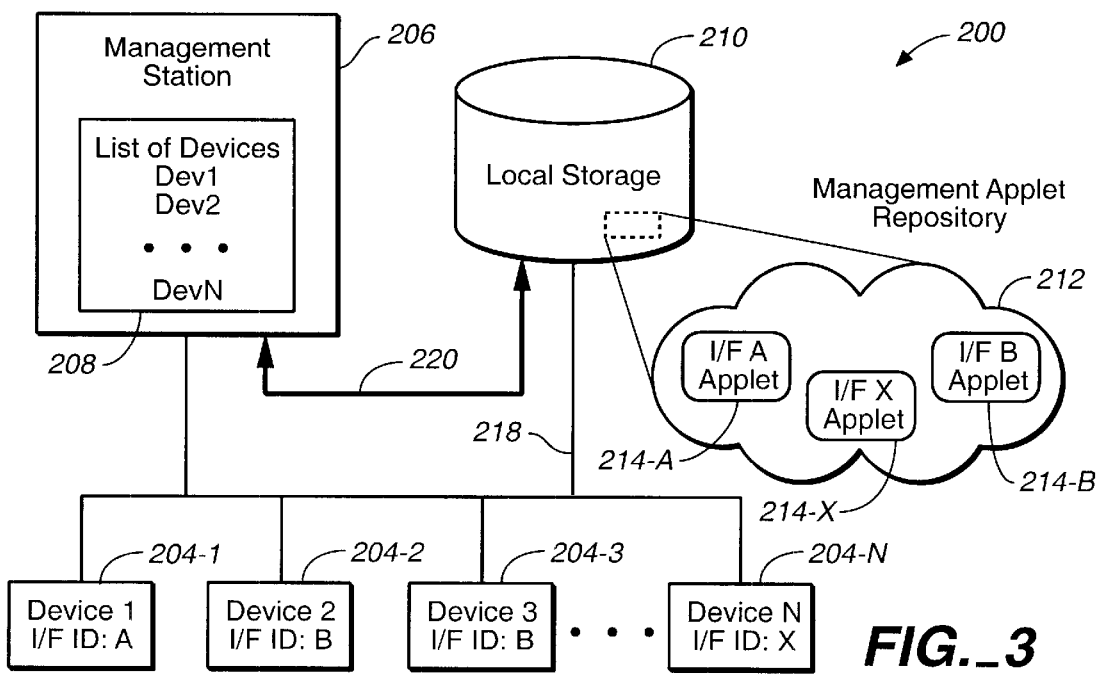
FIG._3

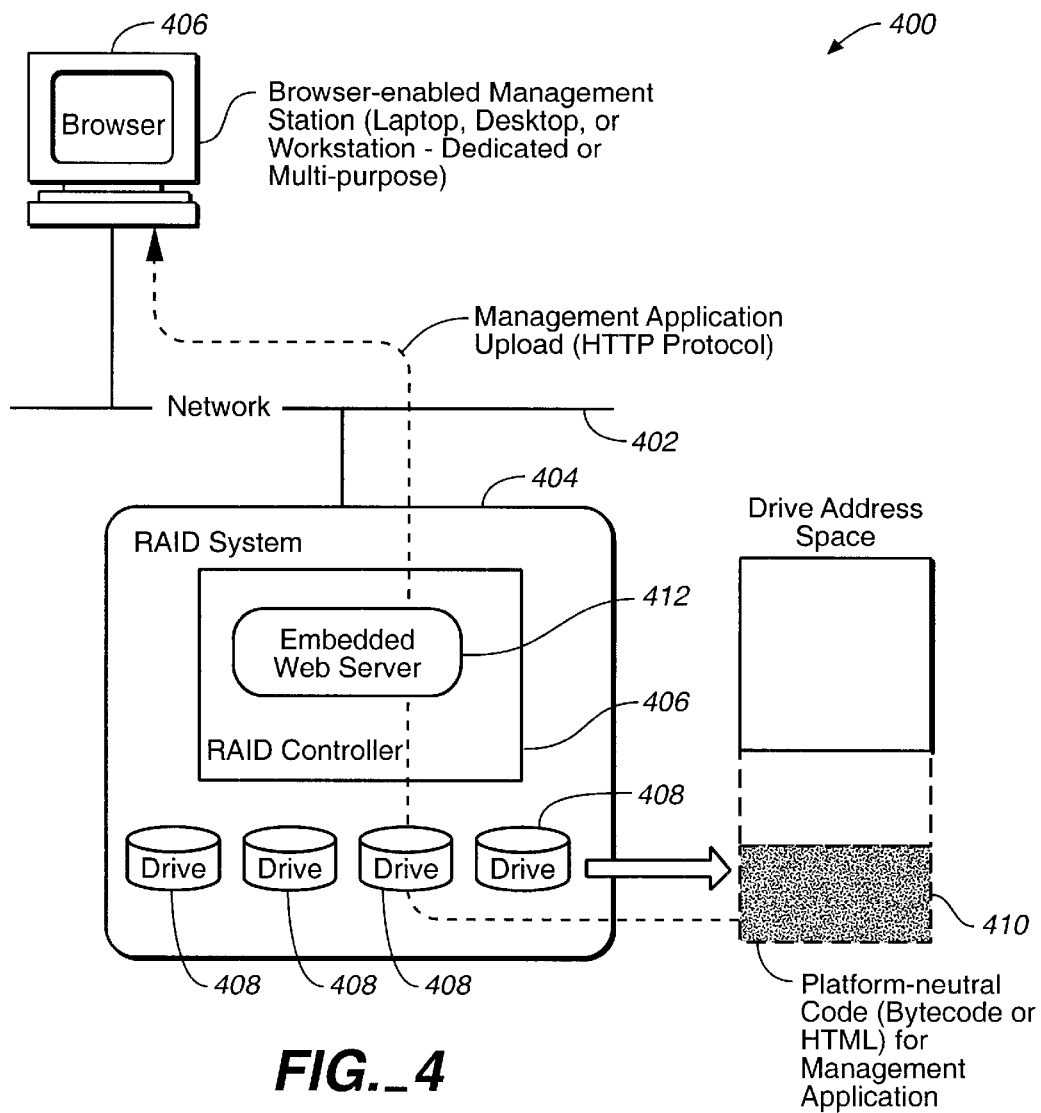
FIG._4

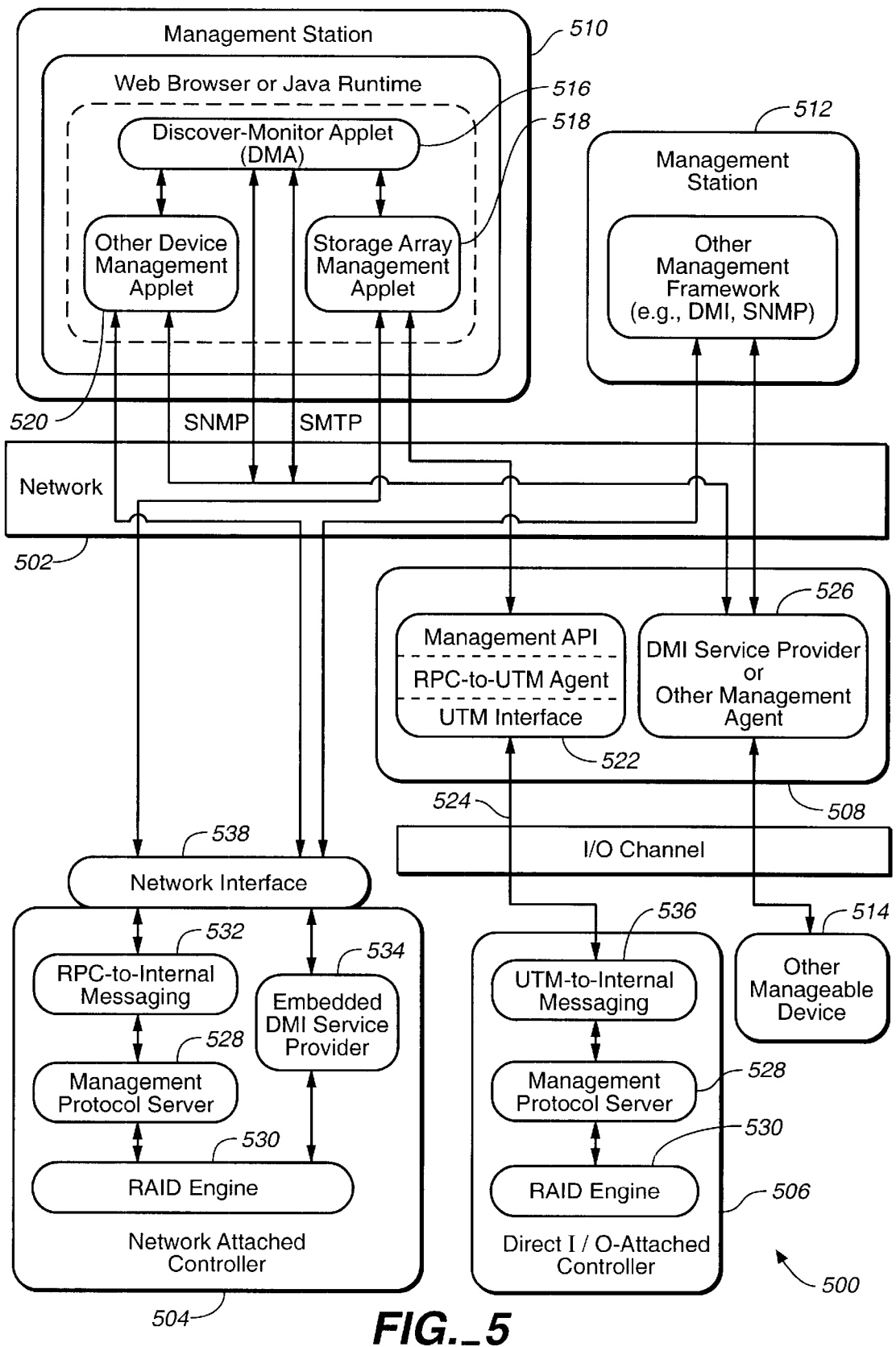
FIG._5

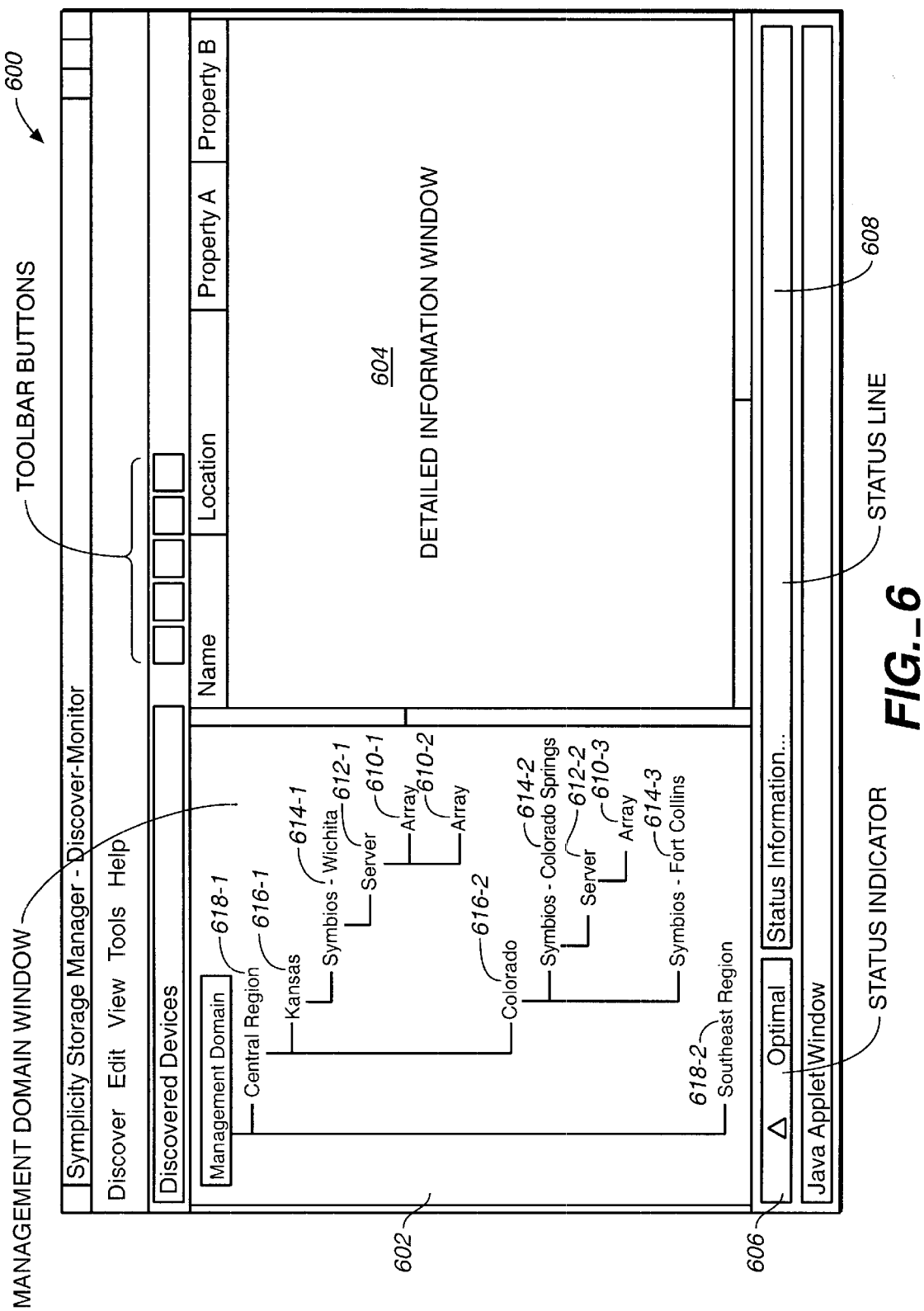
FIG._6

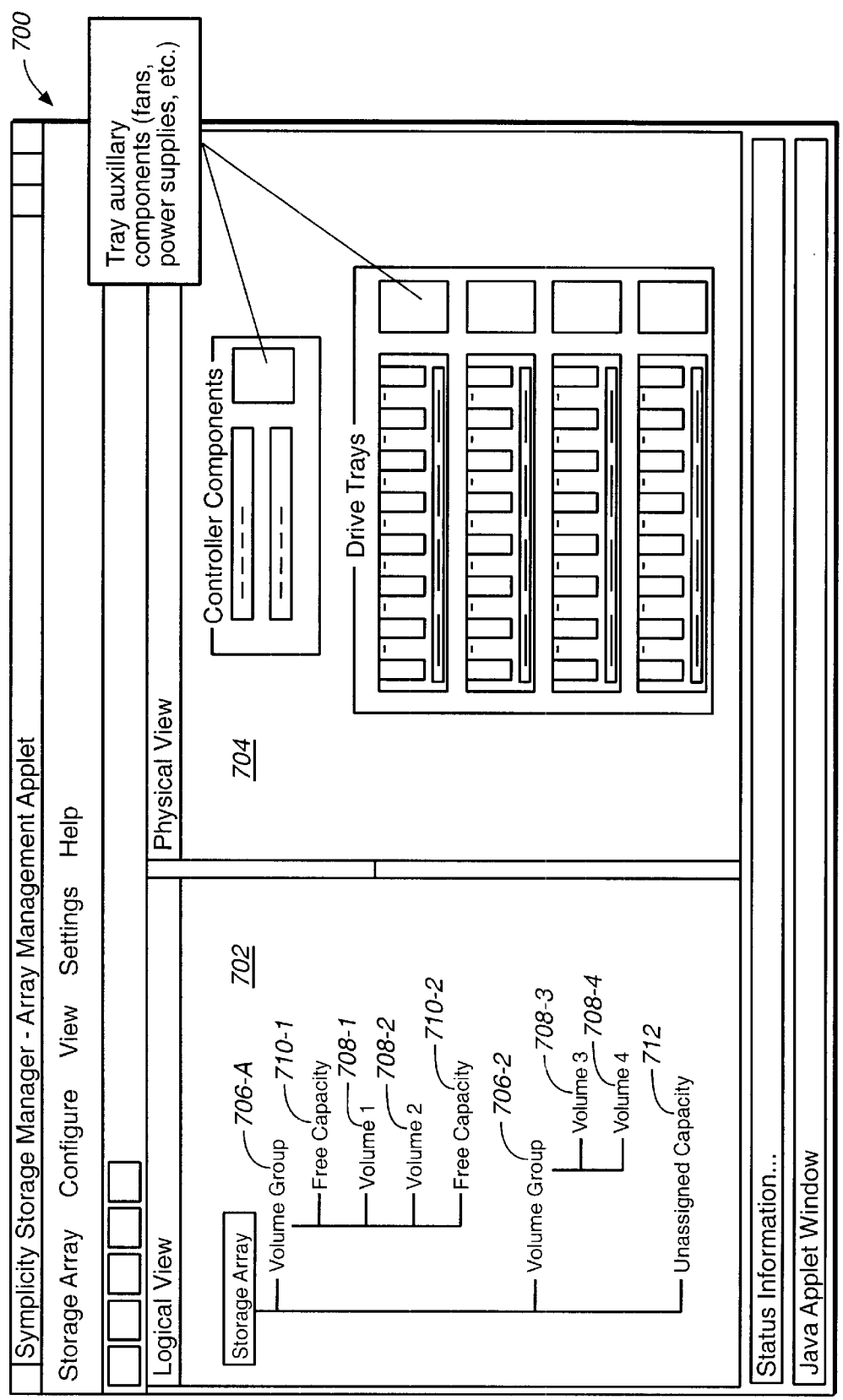
FIG._7

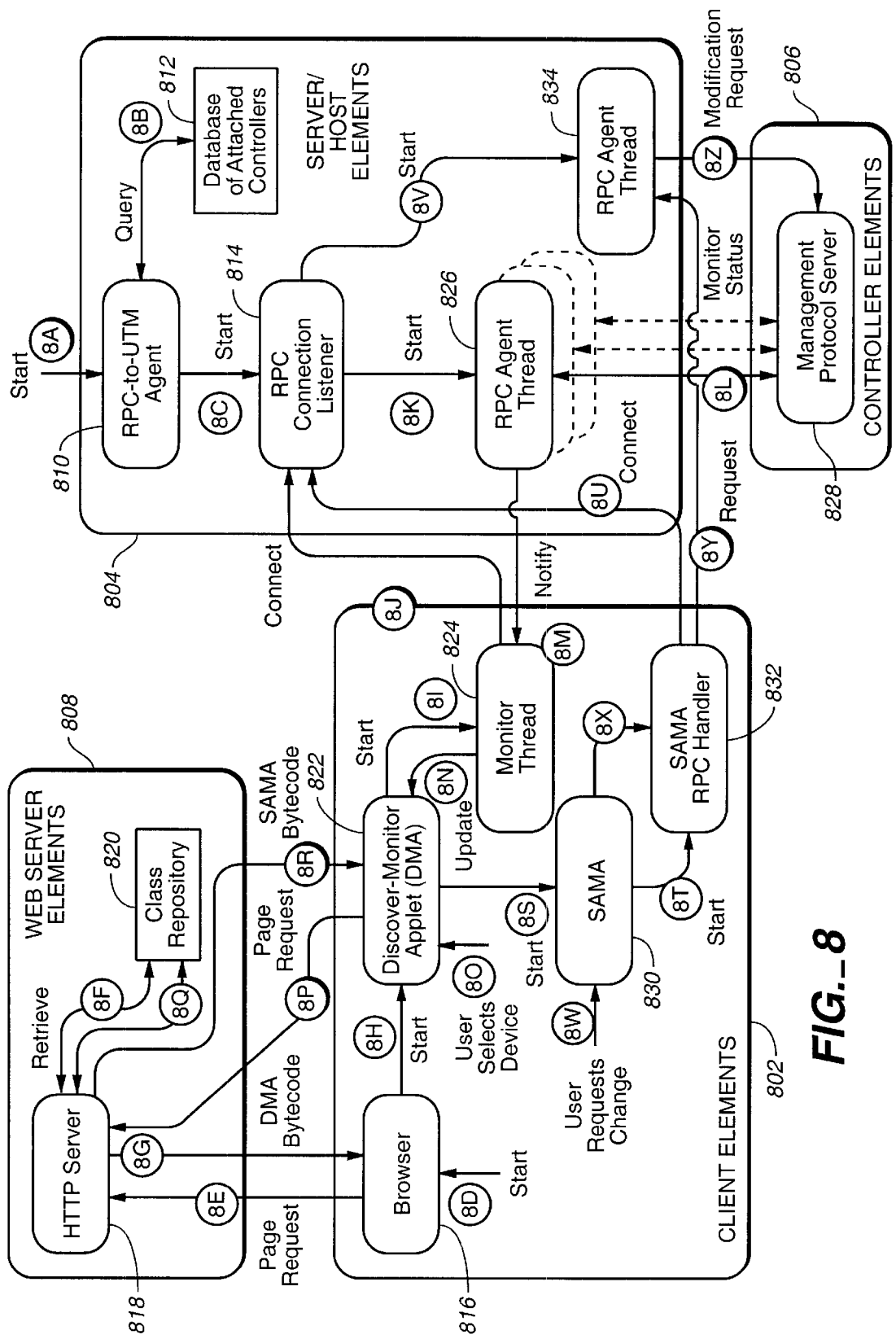
FIG._8

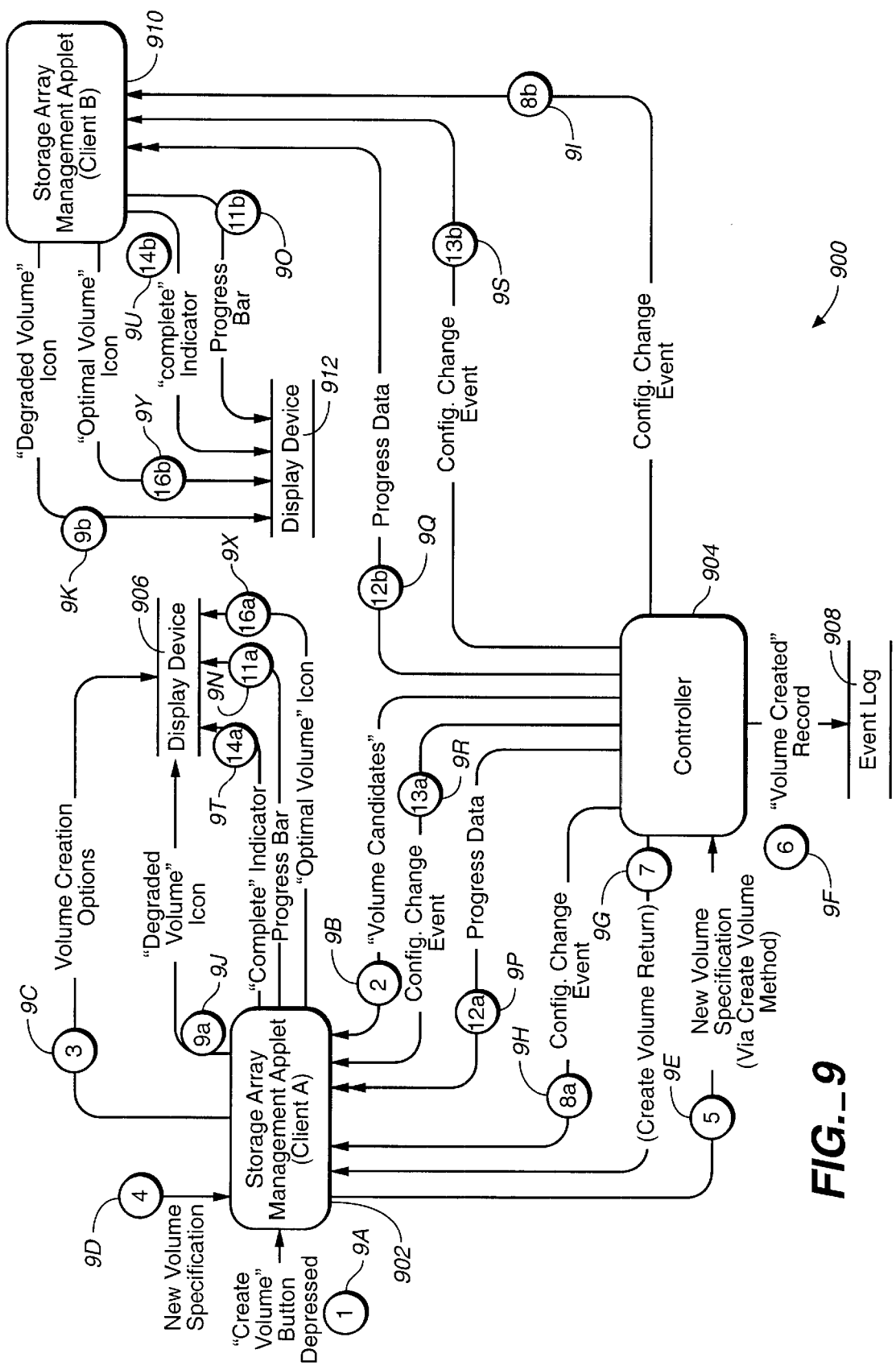
FIG._9

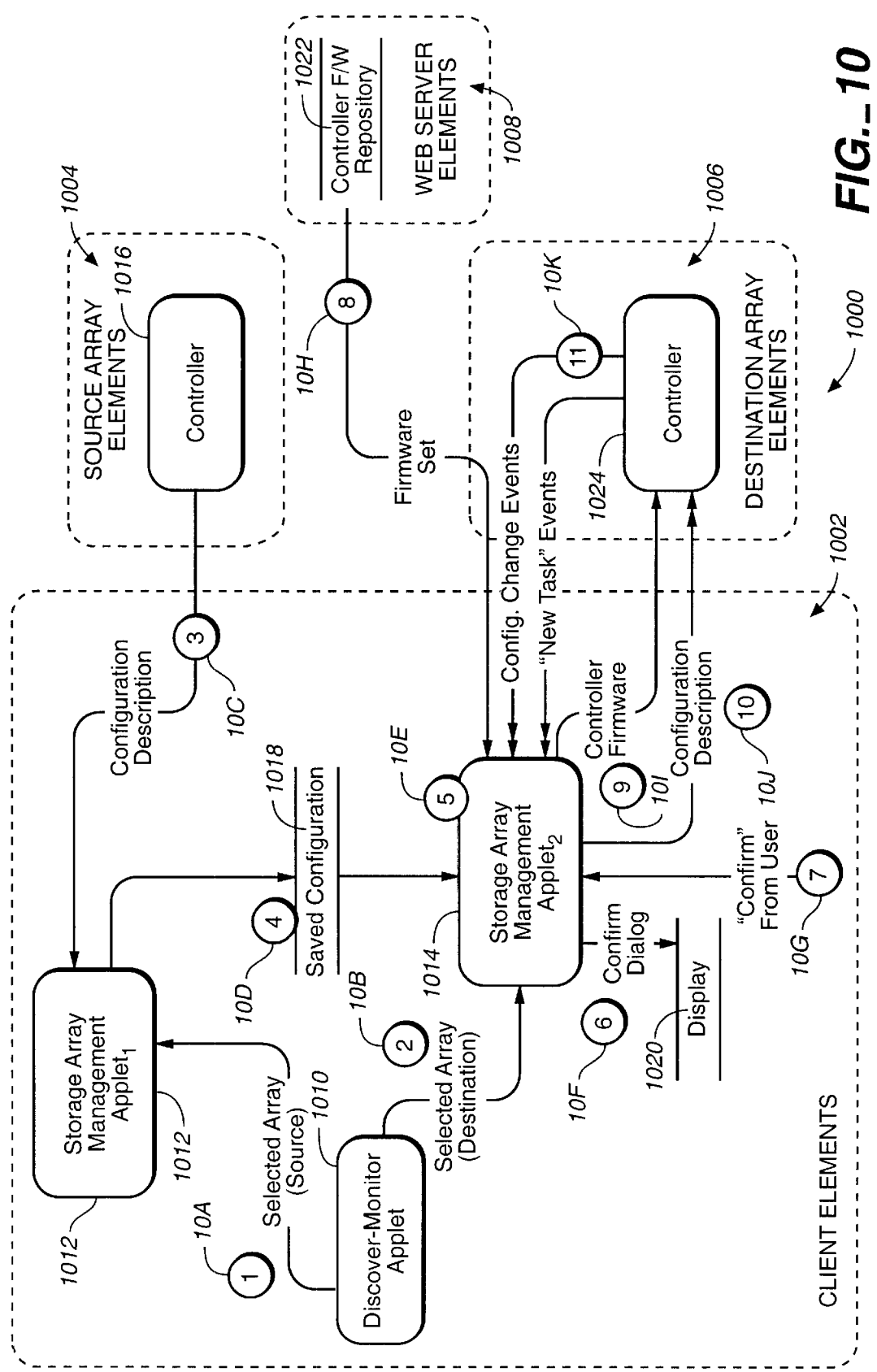
FIG._10

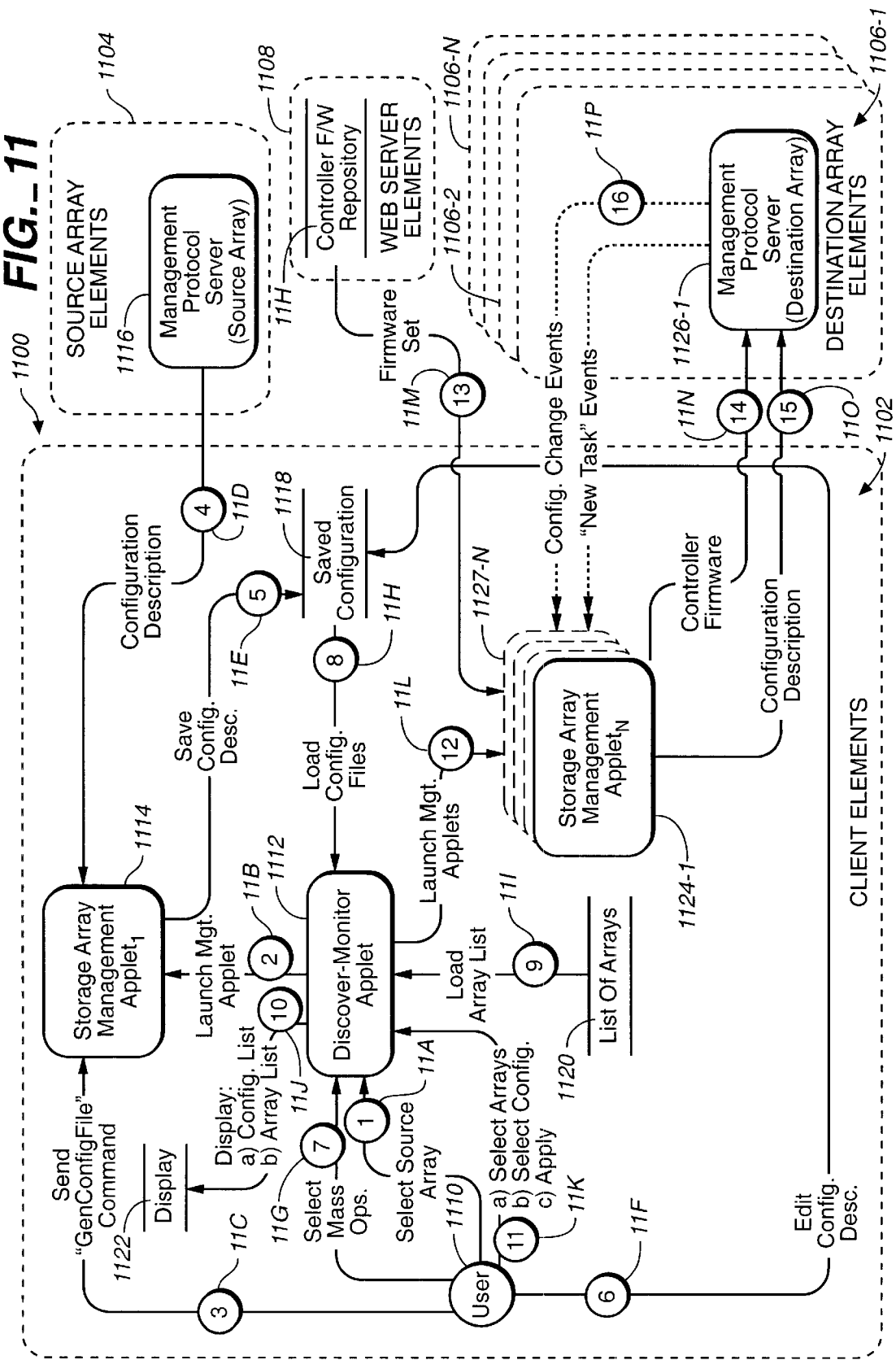
FIG._11

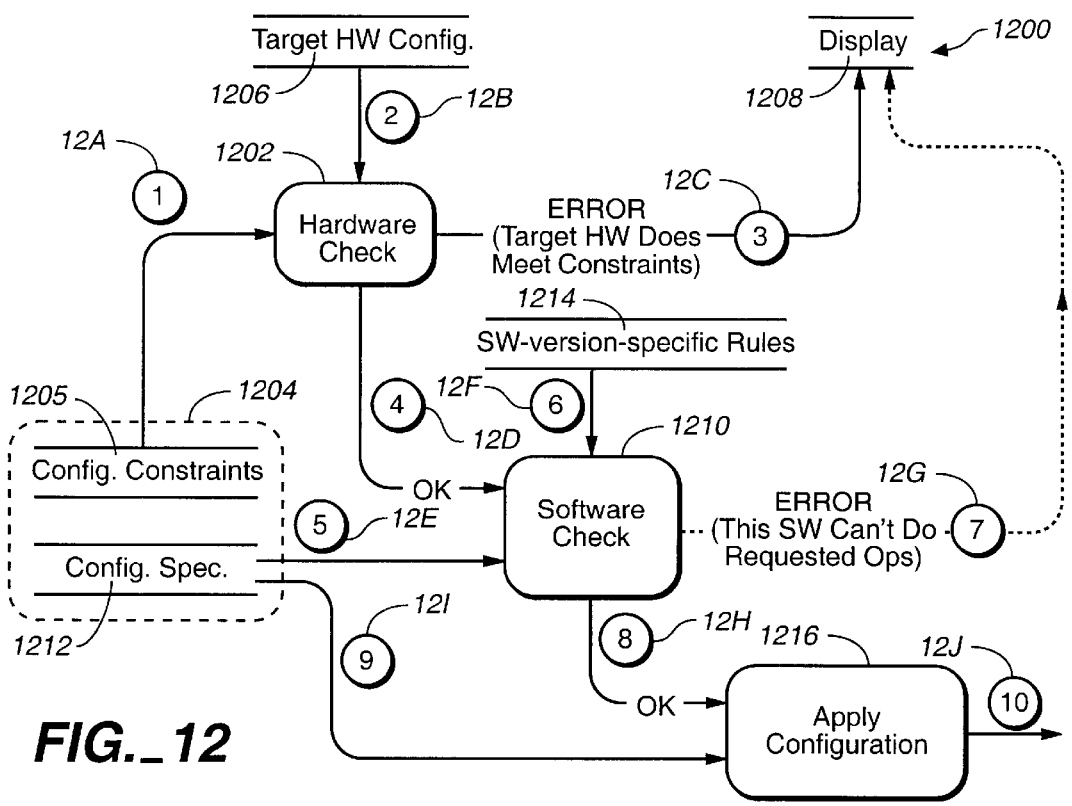
FIG._12
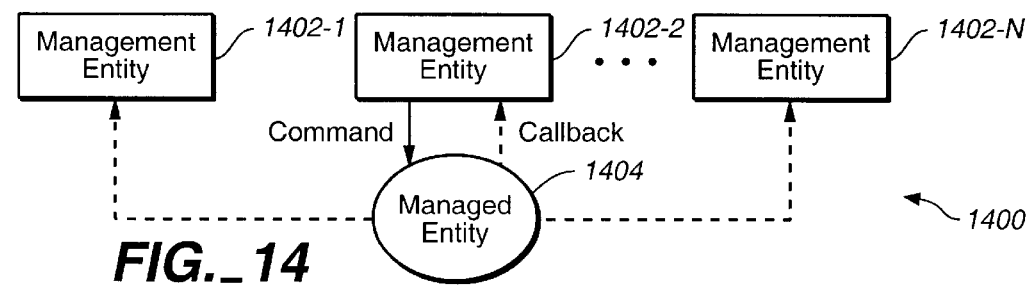
FIG._14
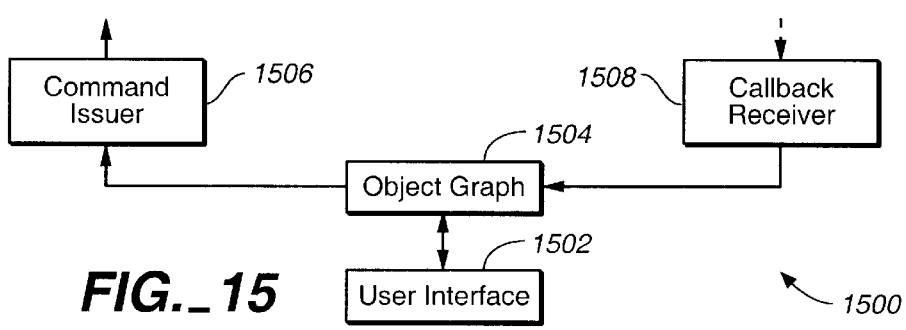
FIG._15

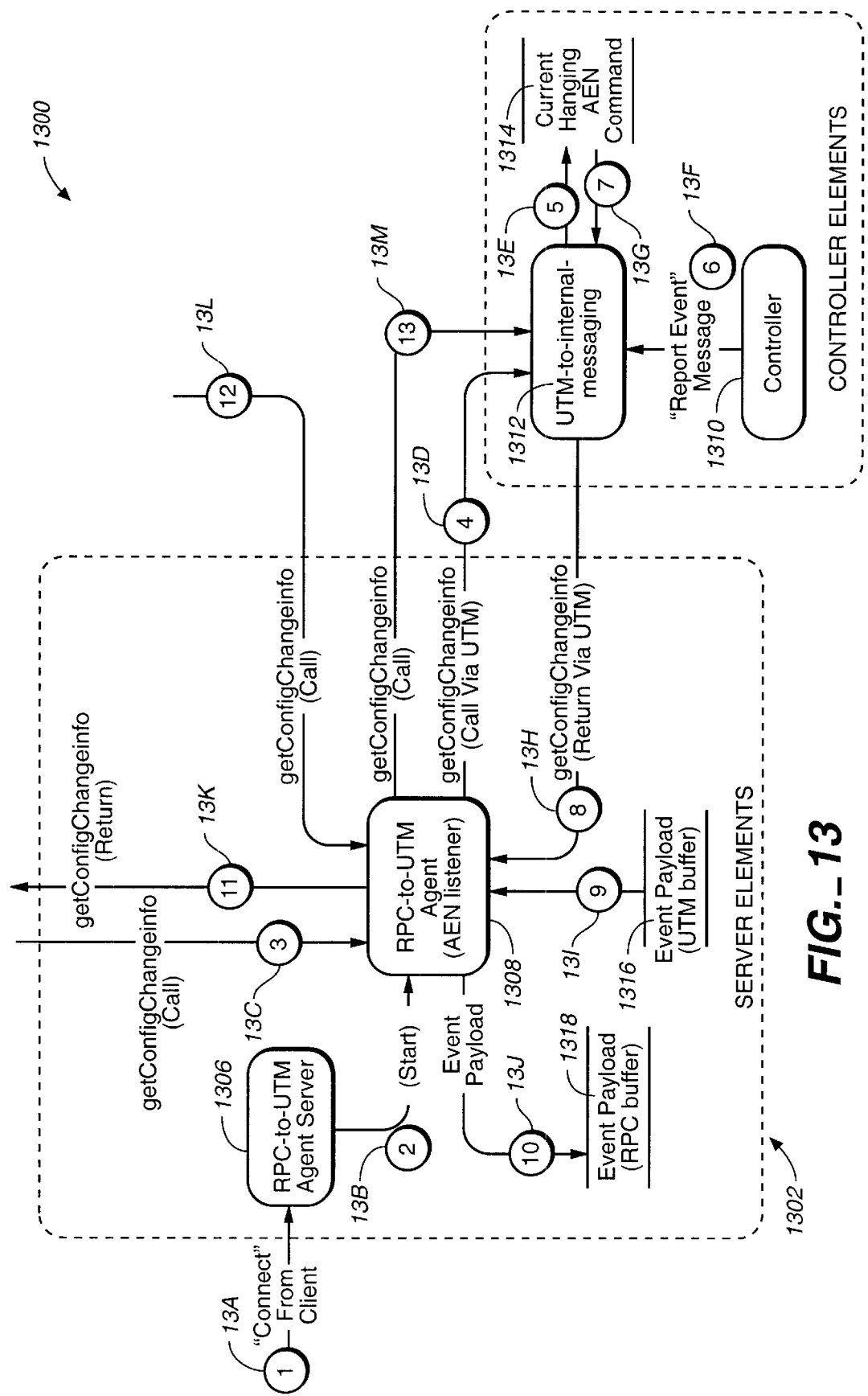
FIG._13

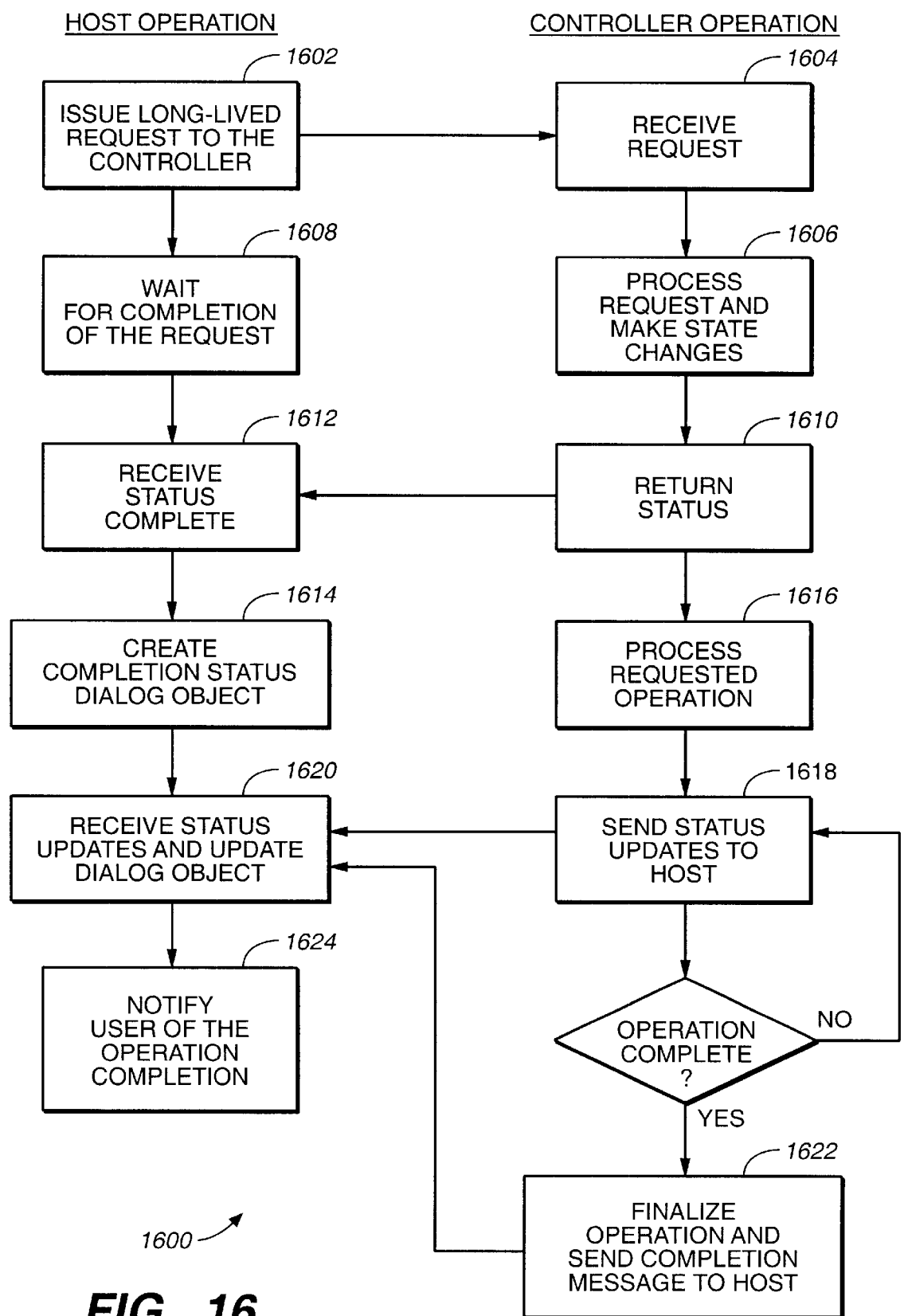
FIG._16

SYSTEM FOR MONITORING AND MANAGING DEVICES ON A NETWORK FROM A MANAGEMENT STATION VIA A PROXY SERVER THAT PROVIDES PROTOCOL CONVERTER

CROSS-REFERENCES TO RELATED APPLICATIONS

This application is being filed concurrently with related U.S. patent applications: Ser. No. 09/350,742, entitled "Methods and Apparatus for Issuing Updates to Multiple Management Entities"; Ser. No. 09/350,800, entitled "Methods and Apparatus for Performing Mass Operations on a Plurality of Managed Devices on a Network"; Ser. No. 09/350,739, entitled "Methods and Apparatus for Managing Heterogeneous Storage Devices"; Ser. No. 09/350,735, entitled "Methods and Apparatus for Committing Configuration Changes to Managed Devices Prior to Completion of the Configuration Change"; Ser. No. 09/350,945, entitled "Platform Neutral Data Storage Management Method and Apparatus"; and Ser. No. 09/350,753, entitled "Apparatus and Method for a Computer Management Storage System", all of which are incorporated herein by reference.

BACKGROUND OF THE INVENTION

The present invention relates generally to methods and apparatus for managing devices on a network, and more particularly to a network based system and software for monitoring and managing devices that are not attached directly to the network, but are proxy attached to the network via another device.

Network computing systems typically require a variety of devices to construct and maintain a working storage system. In addition, companies with large networks typically have a number of different storage systems, many of which can be manufactured by different companies and/or run on different versions of operating software. Storage system devices may include, but are not limited to, host adapters, I/O chips, disk enclosures, and bridge controllers, to name a few.

Each of these components traditionally are managed by proprietary software that is supplied by its manufacturer. In addition, there are a number of third parties which have developed network management frameworks, such as Hewlett-Packard's Open View, IBM's NetFinity, and Computer Associates' Unicenter. Unfortunately, however, while these third party frameworks provide great benefit to the management of applications, servers, and network equipment, they have little success in managing storage devices because no single standard exists for configuring and monitoring storage devices produced by different manufacturers, as well as different versions of storage devices produced by the same manufacturer. Standards such as desk top management interface (DMI) and simple network management protocol (SNMP) are able to manage simple devices such as host adapters and the like, but they fall short when applied to complex devices such as disk array controllers. As one skilled in the art will appreciate, it is not likely that a standard for managing disk array controllers will be created in the future, because unlike host adapters and disk subsystems, each disk array vendor is constantly releasing proprietary features to distinguish itself in the marketplace. It is well known in the art that devices, such as storage systems, can connect directly to the network using, for example, an ethernet or other suitable network adapter. Each device connected directly to the network has an IP address identifying itself on the network. Thus, devices communicating with these direct attached devices easily can locate them because of their unique IP addresses.

As one skilled in the art will appreciate, many devices, such as low end storage systems, or the like, do not connect directly to the network, but are connect to a server or other workstation via PCI, SCSI, fibre channel, USB, firewire, or the like. Thus, the only attachment to the network that these devices have may be through the proxy server device. Accordingly, it is difficult for other devices on the network to locate these devices, because they don't have network IP addresses. Only the proxy server attached to the network has an IP address. It is particularly difficult to manage these proxy attached devices with online management frameworks, because the management stations cannot send suitable management commands to the proxy attached devices. Thus, what is needed is a management framework which can locate these proxy attached devices, and a system which can communicate management commands between a management station the proxy attached devices.

SUMMARY OF THE INVENTION

According to the invention, a system and method for monitoring and managing devices on a network. The system and method preferably comprises a proxy server connected to the network and a managed device connected to the proxy server. The system farther comprises storage means for storing a device management application program associated with the managed device, and a management station in communication with the managed device via the proxy server and in communication with the storage means. The management station preferably is configured to retrieve the device management application program from the storage means and process the device management application program. As the management station processes the device management application program, the management station is able to monitor and manage the managed device.

In accordance with one preferred embodiment of the present invention, the managed device preferably is connected to the proxy server by a suitable communication connection. The communication connection may comprise peripheral component interconnect (PCI), small computer system interface (SCSI), universal serial bus (USB), fiber channel, firewire and the like.

In accordance with yet another embodiment of the present invention, the managed device preferably includes a controller for controlling the managed device. In accordance with this particular aspect of the present invention, when the management station processes the device management application program, the management station is able to send management commands to the controller via the proxy server. Preferably, the managed device is a storage system.

In accordance with yet another embodiment of the present invention, the proxy server preferably includes a device mapper which locates devices connected to the proxy server and assigns a TCP/IP port to each of the devices. Thus, when the device management application program of the management station sends management commands to the controller of the managed device, the device management application program first sends the management commands to the proxy server, and the device mapper in the proxy server routes the management commands to the managed device.

In accordance with yet another embodiment of the present invention, the device management application program preferably communicates with the proxy server using a first communication protocol, and the proxy server communicates with the managed device using a second communication protocol. Thus, the proxy server includes a protocol converter for converting communication messages directed from the device management application program to the managed device from the first communication protocol to the second communication protocol, and for converting communication messages directed from the managed device to the device management application program from the second communication protocol to the first communication protocol. Preferably, the first communication protocol is remote procedure call (RPC) and the second communication protocol is universal transport mechanism (UTM), and the protocol converter comprises an RPC-to-UTM conversion application.

A more complete understanding of the present invention may be derived by referring to the Detailed Description of Preferred Embodiments and claims when considered in connection with the figures, wherein like referenced numbers refer to similar items throughout the figures.

BRIEF DESCRIPTION OF THE DRAWINGS

FIG. 1 is a schematic diagram of a network having various storage systems and storage management stations;

FIG. 2 is a schematic diagram of a network having a management station, which accesses management application programs stored in an application repository storage area connected to the management station;

FIG. 3 is a schematic diagram of a network having a management station, which accesses management application programs stored in an application repository storage area connected to a network;

FIG. 4 is a schematic diagram of a network having a management station, which accesses management application programs stored on the storage system or device being managed by the management station;

FIG. 5 is a block diagram illustrating various devices residing on a network and their associated software components;

FIG. 6 is a drawing of a sample user interface screen of a discover-monitor application program;

FIG. 7 is a drawing of a sample user interface screen of a storage system management application program;

FIG. 8 is a flow diagram illustrating start-up processes of a discover-monitor application program and a storage system management application program;

FIG. 9 is a flow diagram illustrating a process of creating a volume on a storage system;

FIG. 10 is a flow diagram illustrating a process of replicating the configuration of one storage system to another storage system;

FIG. 11 is a flow diagram illustrating a process of performing a mass operation on multiple storage systems on a network;

FIG. 12 is a flow diagram illustrating a validity checking scheme performed by the process of FIG. 10;

FIG. 13 is a flow diagram illustrating a process of reporting events from a storage system to a management station;

FIG. 14 is a flow diagram illustrating a process of a managed entity broadcasting configuration updates to a plurality of management devices;

FIG. 15 is a flow diagram illustrating how a management device issues management commands to managed entities and receives configuration update information from managed entities; and FIG. 16 is a flow diagram illustrating a process of committing configuration changes prior to the completion of a long term event.

DESCRIPTION OF THE SPECIFIC EMBODIMENTS

Introduction

The present invention relates generally to methods and apparatus for managing devices on a network. More particularly, the present invention relates to a system and software for monitoring, configuring and managing heterogeneous storage systems on a network using a single management application residing on one or more management stations.

While the present invention disclosed herein refers particularly to storage systems, it should be appreciated that the management systems and applications of the present invention can be used to manage a wide variety of devices on a network, including workstations, servers, and other suitable I/O devices. Thus, the present invention relates to a management system and applications which have a single user interface for managing network devices, and which can interact with currently existing management frameworks, such as Hewlett-Packard's OpenView, IBM's NetFinity and Computer Associates' Unicenter, to name a few. Finally, the present invention preferably utilizes platform-independent technologies, such as Java and Java run-time environments, so that the particular network architecture, and workstation and server platforms on the network are irrelevant.

System Overview

The present invention comprises a device-independent management framework which supports device-specific management applications. The framework preferably comprises an application that implements a common graphical user interface that is used to manage all I/O devices in an enterprise or on a network. Preferably, at the start of a day, the management framework discovers all I/O devices in the enterprise and displays them, either by physical connectivity, or by logical association. The discovery process can be conducted manually by a user, or it can occur automatically. For each distinct device type being managed or configured, a unique management application preferably is loaded, thus giving the framework the ability to understand device-specific management tasks. Finally, because the architecture gives the management framework the ability to communicate with all I/O devices on the enterprise, operations such as "firmware upgrades" may be performed en mass to common device types.

Referring now to FIG. 1, a system 100 is shown embodying the present invention. In particular, system 100 preferably comprises a local area network 102, a plurality of storage systems 104–110, an I/O management station 112, a desktop management interface (DMI) management station 114, and a simple network management protocol (SNMP) management station 116. In addition, network 102 may be connected to other enterprise or company networks located in remote areas either via direct telephone links or, as illustrated in FIG. 1, through a larger network, such as the Internet 118, or the like. For simplicity, FIG. 1 merely shows network 102 being connected to a storage management station 120 through Internet 118, but as one skilled in the art will appreciate, storage management station 120 may be a single device connected to Internet 118, or storage management station 120 may be a device on a network in a remote location connected to network 102 via the Internet. In any event, the purpose of FIG. 1 is to illustrate that the management framework of the present invention may be used on local area networks, as well as on wide area networks and with remote access devices.

Storage systems 104–110 may comprise any suitable storage system, such as file servers, disk farms, RAID systems, and the like. In addition, the storage systems may comprise controllers which connect directly to network 102 or the storage systems may be connected to network 102 through a computer server. FIG. 1 illustrates a number of different types of storage system configurations which may reside on a network. However, the configurations illustrated in FIG. 1 do not illustrate all the storage system configurations, and thus, the present invention is not limited to the illustrated embodiments.

Still referring to FIG. 1, the various embodiments of storage systems 104–110 illustrated in FIG. 1 will now be discussed. In particular, storage system 104 preferably comprises a RAID storage system which includes a server 122 and a plurality of disk drives 124 connected to server 122. In accordance with this particular embodiment, the processor of server 122 preferably acts as the RAID control device for storage system 104. In this manner, the RAID control software preferably is stored, either on disks 124 or within internal storage of server 122 and is processed by server 122 during operation of the storage system. Disks 124 may be connected to server 122 by any number of connection means 126, such as fiber channel, SCSI, PCI, USB, Firewire, or the like. Server 122 preferably is connected to network 102 via well-known network connection means.

Like storage system 104, storage systems 106 and 108 also preferably comprise RAID storage devices. However, instead of the server acting as the controller for the RAID storage system, the storage systems preferably include their own controllers 128 and 130, which preferably are connected to servers 132 and 134 via PCI bus connections 136 and 138, respectively. Thus, the storage system control functions for storage systems 106 and 108 preferably are performed by controllers 128 and 130, respectively. While controllers 128 and 130 are illustrated as being separate from the RAID disk farm or disk array 140, one skilled in the art will appreciate that controllers 128 and 130 may reside within the enclosure of disk farm 140. Alternatively, controllers 128 and 130 may be configured as co-processors within servers 132 and 134, respectively.

As illustrated in FIG. 1, controller 128 of storage system 106 and controller 130 of storage system 108 are not connected directly to network 102, but are connected to the network via servers 132 and 134, respectively. With this particular configuration, it is difficult for a management device to locate the storage system controllers 128, 130 connected to servers 132, 134, and thus, it is difficult to send management commands to the storage system controllers. However, as discussed in more detail below, servers 132 and 134 preferably include a layer of software which converts requests from the I/O management stations 112, 120 into command packets which are delivered to controllers 128 and 130 and which can be understood and processed by the controllers.

Storage system 110 also preferably comprises a RAID storage system having an independent RAID storage controller 142. However, in this particular embodiment, storage controller 142 preferably includes a network attachment means 144, so that it can attach directly to network 102. In addition, as illustrated in FIG. 1, controller 142 may be connected to a server 146 via a proxy I/O bus 148, such as a SCSI or Fibre Channel bus. In this manner, storage management stations 112, 120 can issue management commands directly to storage controller 142 via network 102, or they can issue management commands through server 146 and across proxy I/O bus 148. As with the PCI attached controllers in storage systems 106 and 108, if access to controller 142 is through server 146 and across proxy I/O bus 148, server 146 preferably includes a layer of software configured to convert requests from storage management stations 112, 120 to command packets which can be received and processed by controller 142. While controller 142 appears to be separate from the RAID storage device 150, one skilled in the art will appreciate that controller 142 may be configured within the disk enclosure of device 150.

As illustrated in FIG. 1, in addition to storage management stations 112, 120, system 100 also may include other network management devices, such as a desktop management interface (DMI) management station 114 and a simple network management protocol (SNMP) management station 116. In addition, other third party management stations, such as Hewlett-Packard's OpenView, Computer Associates' Unicenter, IBM's NetFinity, and/or Microsoft's Microsoft Management Console, may be attached to network 102. Thus, the present invention is not limited to the illustrated embodiment.

In accordance with a preferred embodiment of the present invention, I/O management stations 112, 120 may comprise any suitable computer workstation running on any operating system platform. For example, I/O management stations 112, 120 may run on Microsoft's Windows or NT platforms, Apple's Macintosh platform, a Unix platform, or the like. Thus, in order for I/O management stations 112, 120 to process the management applications associated with each of the storage systems regardless of the I/O management station platform, it is preferable that I/O management stations 112, 120 are equipped with a Java-compliant web browser or other suitable Java run-time environment. Thus, as one skilled in the art will appreciate, if the management application programs for each of the storage systems are written in Java, the operating system environment of I/O management stations 112, 120 is irrelevant. That is, the Java applications can run in any environment, as long as it is a Java-compliant environment.

Referring now to FIG. 2, a more simplified version of a management system framework 200 is illustrated. System 200 preferably comprises a network 202 with a plurality of managed devices 204-1 to 204-N connected thereto. In accordance with this particular embodiment of the present invention, managed devices 204 may comprise storage systems or other suitable I/O devices. In addition, an I/O management station 206 preferably is connected to network 202 and configured to monitor, configure, and manage devices 204 on the network.

As illustrated in FIG. 2, device 204-1 preferably includes control software which uses a management application interface program labeled "A." Similarly, devices 204-2 and 204-3 run control software which use a management interface application program labeled "B." Finally, device 204-N preferably runs control software which uses a management interface application program labeled "X." In addition, system 200 preferably includes a storage system 210 which comprises a management applet repository 212 for holding a plurality of management interface application programs 214. As discussed briefly above, management interface application programs 214 preferably are Java applets which can be run in any suitable Java run-time environment.

In accordance with one aspect of the present invention, applet repository 212 may reside in internal storage of management station 206, or storage system 210 may be an external storage system connected directly to management station 206 via communication link 216. Communication link 216 may comprise any suitable communication link between a work station and a storage system such as PCI, SCSI, Fiber channel, USB, Firewire, or the like. Moreover, in accordance with an alternative embodiment of the present invention and as illustrated in FIG. 3, storage system 210 may be connected to network 202 via a suitable network connection 218. In accordance with this aspect of the invention, management station 206 preferably communicates with storage system 210 through network 202; for example, along communication path 220.

In accordance with one embodiment of the present invention, a user can direct management station 206 to discover all the devices on the network which are to be managed by the management station and displays the devices on the management station display; i.e., a somewhat manual discovery process. In accordance with another embodiment of the present invention, during the start-up of management station 206, management station preferably runs an application 208 which automatically locates all devices 204 residing on network 202, and displays the list of devices on management station 206. Thus, when management station 206 is directed to manage, monitor or configure a device 204 on network 202, management station 206 preferably uses information obtained during the locate process to match a particular device 204 with the appropriate management application 214 residing in repository 212. Once a match is made, management station 206 preferably retrieves the appropriate management application 214 and processes it on the station. As discussed in more detail below, the retrieved management application 214 then performs the necessary functionality to manage, monitor, and/ or configure the particular device. Each management interface application program 214 preferably is configured to communicate with and direct the controller, and in particular the control software, of the associated device 204. For example, management interface application program 214-A is specifically designed to monitor and communicate management and/or configuration commands to device 204-1. Similarly, management interface application program 214-B is configured to monitor and communicate management and/or configuration commands to devices 204-2 and 204-3, and management interface application program 214-X is configured to monitor and communicate management and/or configuration commands to device 204-N. With this particular configuration, if at some later time a managed device 204 is updated to a new level of software that requires a different management interface program 214 to manage that device, or if a new managed device 204 of a different device type is added to the system, the software residing in the updated managed device or the new managed device will indicate the particular management interface application program 214 with which it is compatible. Thus, management station 206 will be able to determine which management information application program 214 residing in repository 212 should launch for a given managed device 204 on network 202.

In accordance with a preferred embodiment of the present invention, when the control software of a managed device 204 is updated, for example to a new version, preferably a new management interface application program is added to the management interface application program repository to go along with the updated control software.

In accordance with an alternative embodiment of the present invention, it may be preferable to only update small portions of the control software at any one time. For example, aspects of an array device that may be updated include individual object revision definitions for drive groups, drives, volumes, redundant controllers, storage systems, and the like. Thus, if only small revisions are made to the control software of a device 204, only small modifications need to be made to the management interface application program 214. Alternatively, instead of changing the management interface application program 214, a new management interface application program 214 may be added to repository 212 and may be run with the original interface application program, so that when the two management interface application programs are run together, they will be compatible with the updated control software of the device.

In accordance with another embodiment of the present invention, instead of the management interface application programs residing in a separate repository as illustrated in FIG. 2, the I/O device itself may act as the repository for the management interface program for that device. Referring now to FIG. 4, system 400 is illustrated in which the management interface application programs for a particular device actually reside on that device. In accordance with this embodiment of the present invention, system 400 preferably comprises a network 402, an I/O device 404, such as a storage system, and a management station 406.

While device 404 may be any suitable I/O device, for the purposes of this example, device 404 preferably is a RAID storage system. Accordingly, RAID storage system 404 comprises a RAID controller 406 and a plurality of storage drives 408. Preferably, a management interface application program for RAID device 414 is stored in an area 410 on one or more of drives 408. Thus, when management station 406 discovers RAID device 404 on network 402, RAID device 404 and in particular RAID controller 406, preferably passes the management interface application program from area 410 on drives 408 to management station 406 across network 402. To facilitate this transfer, RAID controller 406 preferably includes an application 412 which allows it to act as an embedded web server, giving it the ability to pass the management interface application program to management station 406 using a web server protocol, such as HTTP or the like. In this manner, RAID controller 406 will act like any other web server on a network or on the Internet, passing HTML or Java byte code programs to a work station having a web browser or other suitable Java run-time environment.

System Software Components

Referring now to FIG. 5, software components of a management system 500 now will be discussed. In accordance with the embodiment of the present invention illustrated in FIG. 5, system 500 preferably comprises a network 502, a network attached I/O device 504, a proxy attached I/O device 506 attached to network 502 via server 508, an I/O management station 510, and one or more third party management frameworks 512. While I/O devices 504 and 506 may comprise any suitable I/O device on a network, for the purpose of this example, I/O devices 504 and 506 preferably comprise RAID storage systems. In addition, as illustrated in FIG. 5, other manageable devices 514 may be connected to server 508. The other manageable devices 514 may comprise any suitable peripheral device, such as a host bus adapter, just a bunch of disks (JBOD), a SCSI device, or the like.

The following discussion sets forth software elements which preferably reside within each of the devices on system 500. While system 500 is described herein as having a network attached RAID device 504, a proxy attached RAID device 506, and a server 508, one skilled in the art will appreciate that other I/O device connections to network 502 may be used; for example, the other network attachment configurations illustrated in FIG. 1 and disclosed above. Thus, the present invention is not limited to the configuration of FIG. 5.

Management Station Software Components
Discover-Monitor Applet

As mentioned briefly above, management station 510 preferably comprises a Java compliant web browser, or alternatively, another suitable Java run-time compliant environment for running Java applet programs. Preferably one of the application programs which management station 510 processes is a discover-monitor application or applet 516. Discover-monitor applet 516 preferably is a Java applet which is stored in nonvolatile memory in management station 510, or in an applet repository residing on network 502. Preferably, discover-monitor applet 516 can run under either a Java compliant web browser or under an operating system's Java run-time environment.

Discover-monitor applet 516 performs, inter alia, the following functions:

(1) Discovering managed devices on network 502 and presenting them on the management station display;

(2) Understanding and maintaining an association between the discovered managed devices and the specific management interface application program it requires;

(3) Providing a user interface for invoking the management interface application program for a particular managed device, which in turn, presents a more detailed interface for managing the device; and (4) Listening for events from discovered devices and providing notifications, both on-screen visual, as well as via remote e-mail, of device state changes (e.g., "optimal," "needs attention," or "unresponsive"). More detailed device notifications may be provided by the management interface application programs themselves.

In accordance with the present invention, discover-monitor applet 518 preferably is designed to allow coexistence of different management interface application programs for different types of devices, and within a device type, to permit coexistence of interface application programs at different versions of a device's management interface software. Thus, new hardware can be introduced and old hardware can be phased out at a user's convenience without the risk of introducing management incompatibilities.

Management Interface Application Programs

Management interface application programs 518 preferably are Java applets which are device type and version specific program components. A particular management interface application program 518 knows how to manage an individual device of its associated type, and is responsible for presenting the detailed, device-specific management operations to a user. In accordance with a preferred embodiment of the present invention, discover-monitor applet 516 preferably locates and loads the correct management interface application program 518 from storage, based on its knowledge of the managed device's management interface version. Generally, management interface application programs 518 display the current state, status and configuration of a device with which it is associated. In addition, management interface application programs 518 preferably include logic which allows a user to submit management and configuration commands to the managed device. A more detailed discussion of how management interface application programs 518 operate is discussed below.

Server Based Software Components

In accordance with the present invention, the two main purposes of the server based software components are to: (1) Interface proxy attached controllers to the network so they can be managed by management station 510; and (2)Interface the managed devices to other industry standard management protocols and products. Preferably, the server based software components comprise a conversion application for converting RPC commands to a standard I/O read/write mechanism, and a DMI and/or SNMP interface application.

RPC Conversion Agent

RPC conversion agent 522 preferably comprises a thin piece of server 508 resident software preferably written in Java and executing under an operating system's Java run-time environment. The purpose of RPC conversion agent 522 is to support remote procedure call (RPC) traffic between the management interface application program 518 running on management station 510 and a proxy attached storage controller 506 (i.e., a storage controller that does not have its own network connection). As one skilled in the art will appreciate, a storage system connected to a server, for example via a PCI connection, does not communicate with the server using RPC, but using a standard I/O read/write mechanism, such as a SCSI command interface. Thus, for the management application program 518 to communicate with controller 506, RPC conversion agent 522 preferably is configured to receive RPC commands from a management interface application program 518 and convert the RPC command to a protocol which storage controller 506 will understand. In this particular example, the RPC conversion agent 522 encapsulates RPC messages within I/O write commands to send them to the direct-attached controller 506 via I/O path 524. Similarly, the RPC conversion agent 522 receives RPC responses from controller 506 via I/O read commands, extracts the RPC responses from the I/O read commands and forwards the RPC responses to management application program 518. In accordance with a preferred embodiment of the present invention, the protocol for encapsulating RPC messages within read/write commands is a Universal Transport Mechanism (UTM), a protocol developed by LSI Logic Corporation, located in Milpitas, California. RPC conversion agent 522 allows all management interface programs 518 to be written the same, regardless of whether the storage controller has a direct network connection or not. If the storage controller is not directly attached to the network, RPC conversion agent 522 performs the proper protocol conversion.

Other Management Framework Agent

Server 508 also preferably includes software to interface server 508 and other connected devices with other third party management frameworks or protocols, such as desktop management interface (DMI), simple network management protocol (SNMP) and/or common information model (CIM). In accordance with this aspect of the present invention, server 508 preferably includes a management framework agent 526, which comprises one or more applications which facilitate communication between management stations like DMI, SNMP and/or CIM stations and devices connected to server 508. For example, in the case where DMI is used, agent 526 preferably comprises one or more DMI applications which enables devices to be managed within a DMI conformant management framework. The DMI architecture allows a device to deliver events to, respond to management information requests from, and even to be controlled by a DMI conformant management application.

Server 508 also preferably supports the SNMP and CIM architectures. In accordance with this aspect of the present invention, agent 526 on server 508 preferably includes an SNMP framework application and/or a CIM framework application. In this manner, an SNMP or CIM management station can send requests to and receive event notifications from a device connected to server 508. DMI, SNMP and CIM interface agents are known in the art, and thus, will not be described further herein.

Controller-Based Software Components

Device controllers 504 and 506 both preferably include a management protocol 528 and a RAID engine 530. In addition, network attached controller 504 preferably includes an RPC-to-internal-messaging component 532 and a controller embedded DMI, SNMP and/or CIM service provider 534. In addition, proxy attached controller 506 preferably includes a UTM-to-internal messaging component 536.

Management Protocol

The architecture of the present invention is centered around an object model of the managed devices, which is the basis for communication between management station 510, and in particular management interface application program 528, and the devices (504, 506). The object model preferably is the actual physical and logical configuration of the device. In the storage array case, the object model of the storage array is handled by the controller via a management protocol 528. An example of a suitable management protocol is LSI Logic's SYMbol (symbios browser-oriented language) protocol. Management protocol 528 preferably receives high-level requests from management interface application (or applet) program 518 expressed in terms of the device object model, interprets the requests, carries out the requests by interacting with RAID engine 530 and then responds back to the management interface applet 518 in terms of the object model. The object model also defines events that originate with the managed device and flow to the management station 510; this event propagation is also the responsibility of management protocol 528.

RAID Engine

RAID engine 530 is the part of the storage controller firmware that is responsible for the core RAID implementation, independent of the host and drive interfaces with which it interacts. RAID engine 530 preferably comprises a performance critical RAID read/write/caching component and a less-performance-critical configuration and management component. The configuration and management component, which is the focus and the content of the management architecture of the present invention, preferably exhibits three main types of behavior: (1) carrying out management related tasks when directed to do so by the management station 510 and more specifically, management interface application program 518; (2) performing certain tasks automatically, either when necessary, or on a regular schedule (e.g., error and event logging and parity assurance); and (3) initiating notifications of important events, which are then propagated outside of the controller over network 502, either directly or via UTM in the proxy attached case.

UTM-to-Internal-Messaging

As discussed briefly above, proxy attached controller 506 preferably includes a UTM-to-internal-messaging component 536. UTM-to-internal messaging component 536 pref-erably is part of the controller firmware for proxy attached controller 506, and is responsible for providing management protocol packet transport over the block read/write path between server 508 and controller 506. This communication preferably is bi-directional, allowing commands to be transported into and responses to be transported out of controller 506.

As discussed above, management interface application programs 518 preferably communicate using the RPC protocol. In the proxy attached controller 506 case, controller 506 communicates with server 508 using UTM, so RPC conversion agent 522 in server 508 converts the RPC commands to the UTM format before communicating with controller 506. Upon receiving the UTM packets, UTM-to-internal-messaging component 536 preferably converts the UTM packets to packets and commands which can be understood by management protocol 528. Thus, UTM-to-internal-messaging component 536 in essence comprises a UTM interface for controlling communications between server 508 and controller 506, and an internal controller mechanism for controlling command and event notification dispatch to and from management protocol server 528.

While a preferred embodiment of the present invention is described herein as using UTM to communicate between server 508 and device 506, one skilled in the art will appreciate that other 1/O read/write mechanisms, such as a SCSI command interface, may be used. Therefore, the present invention is not limited to the UTM embodiment.

RPC-to-Internal-Messaging

As mentioned briefly above, network attached controller 504 preferably includes an RPC-to-internal-messaging component 532. RPC-to-internal-messaging component 532 preferably is part of the network attached controller firmware which transports RPC transactions between the controller network port and the management protocol server 530. Preferably, packets crossing the controller network port interface 538 conform to standard RPC commands. At RPC-to-internal-messaging component 532, the RPC commands are converted to the management protocol format 528. Thus, the combination of the RPC conversion agent 522 in server 508 and the UTM-to-internal messaging component 536 in proxy attached controller 506 is the functional equivalent of the RPC-to-internal-messaging component 532 of network attachment 504. That is, RPC conversion agent 522 and UTM-to-internal-messaging component 526 effectively convert the RPC commands from management interface application 518 to the management protocol 528 format. However, with the proxy attached controller 506, an additional protocol, preferably UTM between server 508 and controller 506 is used.

Controller Embedded DMI, SNMP and/or CIM Service Provider.

Embedded service provider 534 in network attached controller 504 preferably is one or more software elements defined under the DMI, SNMP and/or CIM architectures. The embedded service provider 534 is configured to mediate between managed objects, such as controller 504, and a DMI, SNMP or CIM management application. By adding embedded service provider 534 within the network attached controller 504, controller 504 can interface with a DMI, SNMP or CIM management application on network 502. DMI, SNMP and CIM management applications may reside within a separate management station, such as management station 512, or the DMI, SNMP and CIM management applications may be applications or applets 520 which executes in the Java run-time environment of management station 510.

User Interface

As discussed briefly above, a user preferably interfaces with the management station 510 via a discover-monitor application program 516 and a management interface application program 518 for each of the devices on the network. Preferably, both the discover-monitor application 516 and each of the management interface application programs 518 are Java programs or applets which run in a Java run-time environment.

Discover-monitor Application

Referring now to FIG. 6, a representation of a discover-monitor application screen 600 is illustrated. Preferably, discover monitor application screen 600 includes a management domain window 602, a detailed information window 604, a status indicator 606 and a status line 608.

In accordance with a preferred embodiment of the present invention, management domain window 602 presents a tree structured view of the complete management domain. Lower level nodes 610, 612 in the tree structure represent actual physical hardware devices such as servers, arrays, and other I/O devices. For example, as illustrated in FIG. 6, lower level node or server 612-1 includes two storage arrays 610-1 and 610-2 attached thereto. Similarly, lower level node or server 612-2 includes a storage array 610-3 attached thereto. The higher level nodes in the tree represent the location of the hardware devices. For example, in the illustrated embodiment, the management domain is divided into two regions: a central region 618-1 and a southeast region 618-2. Within central region 618-1, the domain is further broken into states 616, for example, Kansas 616-1 and Colorado 616-2. From there, the domain is further broken down into plant locations 614, for example, in Colorado 616-2, the illustrated company has locations in Colorado Springs 614-2 and Fort Collins 614-3. The management domain shows the servers, storage arrays and other devices which exist on the networks of those locations.

Detailed information window 604 preferably presents the detailed properties for each device in the management domain, based upon the particular node a user selects. Individual device nodes 610, 612 or a higher level location nodes 614, 616, 618 may be selected. When a location is selected, the detailed information window preferably includes an entry for each device in the subtree rooted at the selected location. When a specific device node is selected, detailed information window 604 displays certain device specific attributes of the selected node. In addition, by double-clicking or selecting a specific device node, the device's associated management interface application program is launched.

Status indicator 606 preferably includes a high level indication of whether or not any of the devices in the management domain have problems that require attention. If all devices are in working order, the status indicator preferably will indicate "optimal"; if there is a problem somewhere in the management domain, the status indicator 606 preferably will show that one or more devices require attention. Preferably the devices that have a problem will be indicated in the management domain window 602 by a highlighted color of that device, or an appearance change of the device icon. Finally, status line 608 preferably is an area for short pieces of context-sensitive information which the discover-monitor application program may wish to display.

While the discover-monitor application screen illustrated in FIG. 6 and disclosed herein presents information in a certain way and includes specific information, one skilled in the art will appreciate that the discover-monitor application screen may be designed and configured in any way. For example, the discover-monitor application screen may show additional information, or certain information that is displayed in the discover-monitor application screen of FIG. 6 may be eliminated. In addition, the information may be presented in a different way. Thus, the present invention is not limited to the specific embodiment of the discover-monitor application screen illustrated in FIG. 6.

Management Interface Application

Referring now to FIG. 7, screen display 700 of a management interface application or applet program is illustrated. When a user selects and opens a particular device from the discover-monitor application screen, the management interface application program for that device is loaded into the management station, and a screen similar to screen 700 preferably is displayed. Display 700 preferably includes a logical view window 702 and a physical view window 704.

Logical view window 702 illustrates the logical composition and properties of the selected device (e.g., storage array). The logical objects of the storage array are organized into a tree structure to make their interrelationships apparent. Screen 700 illustrates an example of a typical set of logical objects, including volume groups 706, volumes 708, free capacity regions 710, and unassigned capacity 712.

Physical view window 704 preferably illustrates a view of actual hardware components in a particular device or storage array, e.g., controllers, drives, drive trays, disks, etc. Preferably, the physical view of the storage array displayed in physical view window 704 is an accurate graphical representation of the actual storage array device on the system. In this manner, the user can tell what the device looks like without being within visual range of the device. In the physical view 704, components in need of repair or replacement preferably will be distinguished by color and/or appearance changes. In addition, color or other visual differences may be used to indicate different roles or states of disk drives (i.e., assigned, unassigned, hot, spare, etc.). As with discover-monitor output screen 600, management interface application screen 700 is not limited to the embodiment shown in FIG. 7. Additional information may be added, deleted, or the actual presentation of the information may vary. Thus, the present invention is not limited to the illustrated embodiment.

System Functionality

Discover Monitor Applet Startup

Referring now to FIG. 8, a flow diagram 800 is shown illustrating a start-up procedure for a discover-monitor application and a management interface application. Flow diagram 800 includes client or management station elements 802, server elements 804, device controller elements 806, and web server elements 808. In accordance with a preferred embodiment of the present invention, when server 804 starts-up, for example, during morning start-up, an RPC-to-UTM Agent 810 automatically starts running on server 804 (step 8A). Next, RPC-to-UTM Agent 810 preferably queries a database 812 on server 804 to determine which devices connected to server 804 (in this particular example, storage controllers) require RPC-to-UTM transport services (step 8B). Preferably, database 812 stores a record for each device connected to server 804. The device records in database 812 preferably include a field which indicates whether the device requires RPC-to-UTM transport services. For each device requiring RPC-to-UTM transport services, RPC-to-UTM agent 810, starts an RPC connection listener 814 (step 8C). While the illustrated embodiment shows only one RPC connection listener 814, other connection listeners may be running on server 804.

When a user wishes to begin the device management process, the user preferably starts-up management station 802, which starts a browser session 816 (step 8D). During the browser start-up process, the user preferably supplies the URL of the process discover-monitor applet to be run. Browser 816 uses the URL to address an HTML page on web server 808. Alternatively, the URL may be stored in the browser or on the machine running the browser. Browser 816 then contacts web server 808's HTTP server 818 and asks that the discover monitor applet (DMA) be transferred to browser 816 (step 8E). In accordance with a preferred embodiment of the invention, HTTP server 818 retrieves the DMA program from an applet repository 820 on web server 808 (step 8F) and sends the DMA program to browser 816 (step 8G).

In accordance with an alternative embodiment of the present invention, instead of HTTP server 818 sending the actual DMA program to browser 816, HTTP server 818 may send an HTML page to browser 816, notifying the browser of the location of the DMA program. Then, browser 816 preferably retrieves the DMA program from the specified location. In the illustrated embodiment, the location of the discover-monitor applet happens to be on web server 808. However, as discussed previously, the discover-monitor applet may reside in a repository stored on one or more storage systems residing on the network. In addition, while the start-up process discussed herein refers to an HTTP server sending HTML pages to browser 816, other start-up procedure may occur. For example, communication protocols and languages other then HTTP and HTML may be used. Finally, while the illustrated embodiment shows web server 808 being separate from management station 802, the present invention may be configured so that web server 808 is part of management station 802.

After browser 818 retrieves the discover-monitor applet program from applet repository 820, the discover-monitor applet 822 is invoked according to the standard browser of Java run-time environment protocol for starting an applet (step 8H).

In accordance with one embodiment of the present invention, a user may utilize DMA 822 to discover each managed device connected to the network. In accordance with this particular embodiment of the invention, the user preferably enters the device into DMA 822, and DMA 822 then starts a monitor thread 824 for the entered device. Preferably, there will be a monitor thread 824 for each device selected by the user.

In accordance with an alternative embodiment of the present invention, discover-monitor applet 822 may be configured to automatically discover all the devices on the network. DMA 822 discovers all direct network attached devices and all servers on the network. Upon locating a server, discover-monitor applet 822 requests from the server a list of all storage controllers or devices it has associated with it. After locating all the devices on the network to be managed, DMA 822 starts a monitor thread 824 for each device (step 8I).

After initializing a monitor thread 824 for each discovered device, the monitor threads 824 preferably initiate a connection to their associated devices 806 by connecting to the RPC connection listeners 814 (step 8J). As discussed above, RPC connection listeners are started on one or more servers 804 for each device 806 connected to the servers and being monitored by the management station. Once monitor threads 824 are connected to RPC connection listener 814, RPC connection listener then creates an RPC agent thread 826 for servicing the connection (step 8K).

In each device controller 806, a management protocol server 828 is listening for management protocol requests. Each management protocol server 828 is queried (via an RPC agent thread 826) for its associated device properties (step 8L). Using the information from this step 8L, RPC agent thread 826 notifies monitor thread 824 of the device properties of the associated device 806 (step 8M). In turn, monitor thread 824 then updates DMA 822 with the device properties (step 8N). Upon receiving the device properties, DMA 822 builds a device connection table, which gives, for each device, a list of connections into the device. The connection-to-device map may be one-to-one, or many-to-one. In addition, the device connection table may include information about which management application program is associated with each device.

Finally, with all storage arrays discovered, and all communication links set up, discover-monitor applet 822 displays the discovered devices on a display screen from which device specific storage management applications may now be launched.

In addition to obtaining device properties from devices 806, monitor thread 824, and RPC agent threads 826 for each device may be configured to monitor each device 806 for configuration changes or other device events. In accordance with this aspect of the present invention, discover-monitor applet 822 prepares for event listening by starting a management protocol "event listener" thread, which detects events from the device via the "Hanging AEN" protocol. Monitor thread 824 on management station 802 preferably acts as the event listener thread, and starts the hanging AEN event in much the same way as the other RPC agent threads are started. That is, event listener thread or monitor thread 824 in management station 802 establishes a connection to the RPC connection listener 814 in server 804 (step 8J), which initiates an RPC agent thread 826 (step 8K). For device monitoring, the agent thread 826 preferably is configured for hanging AEN listening, and thus, initiates a hanging AEN listen primitive on controller 806, and in particular management protocol server 828.

In accordance with a preferred embodiment of the present invention, the hanging AEN listening threads exist until an event occurs on a device 806. For example, if the configuration of device 806 changes for any reason, the hanging AEN agent thread 826 will detect the change and notify monitor thread 824 of the change (step 8M). Monitor thread 824 then will update the device characteristics of device 806 on DMA 822 which then displays the configuration change status on a display associated with DMA 822 (step 8N). After the update, DMA 822 then will start another hanging AEN thread for that device. A more detailed discussion the event notification process is discussed below in the section entitled Event Reporting.

Management Interface Application Start-up

Still referring to FIG. 8, flow diagram 800 also illustrates the start-up procedures for a management interface application. As discussed previously, discover-monitor application or applet 822 preferably discovers and lists all devices and/or storage systems connected on a network. For this particular example, the devices will be storage system devices. To start a management interface application for any of the storage systems on the network, the user preferably double-clicks on one of the storage systems when viewing it in the discover-monitor application (DMA) screen (step 8O). Next, DMA 822 preferably receives device property information about the selected storage system device from a device property storage area (not shown).

Included in the device properties is the storage system's management interface version (i.e., the management application program associated with that device). Next, DMA 822 retrieves from applet repository 820 residing on web server 808 or some other location the management interface application program version specified in the device properties for the selected device (steps 8P-8R). Preferably, the management interface application program is a Java applet which is loaded into and run on management station 802 using a web browser or other suitable Java run-time environment. After retrieving the management interface application program from repository 820, DMA 822 then launches the management interface application 830 for the selected storage system (step 8S).

Once started, management interface application 830 preferably starts a management interface application RPC handler 832, which controls the communication of RPC commands between management application 830 and server 804. Management interface application RPC handler 832 then starts an RPC agent thread 834 on server 804, which facilitates communication between management interface application 830 and device 806 (step 8Y). Next, using RPC agent thread 834, management interface application 830 retrieves the selected storage system's internal object organization residing on controller 806 of the storage system (step 8Z). With this information, management interface application 830 knows how to connect to management protocol server 828 running in the storage system controller 806. The object graph received from storage system controller 806 identifies the objects comprising the storage array and their interrelationships. For each object in the object graph, management interface application 830 preferably initiates a proxy object to represent the storage system's object graph on management station 802. That is, management interface application 820 stores a copy of the storage system's object graph on management station 802, so it can access and display the object graph when necessary. After retrieving the storage systems organization and configuration, management interface application 830 displays the storage system's configuration on a display screen.

When a user wants to change the configuration of one of the devices on the network, for example device 806, the user instructs the management interface application 830 to initiate the change (step 8W). Management interface application 830 then passes the change request to RPC handler 832 (step X), which issues the request to RPC agent thread 834 as an RPC command (step 8Y). RPC agent thread then encapsulates the RPC change request into a UTM packet and transmits the change to the controller of device 806 (step Z). Device 806 preferably processes the change request and sends a status update information back to management interface application 830. More detailed discussions of how configuration change requests are processed are discussed below in the sections entitled Volume Creation, Configuration Replication, and Long-Term Operations.

In accordance with the embodiment of the present invention described herein, preferably server 804 includes demultiplexing software for routing management commands to the proper device 806 attached to server 804. Because devices 806 are attached to the network via server 804, management commands directed to devices 806 are sent to the IP address of server 804, not the IP address of the devices 806. Thus, server 804 includes intelligence (preferably built in software) for directing the management commands to the proper RPC Connection Listener 814 and/or RPC Agent Threads 826, 834 associated with the proper device 806.

In accordance with yet another embodiment of the present invention, instead of server 804 having demultiplexing software for directing commands to the proper device 806, server 804 may include a device mapper for allocating IP addresses to the connected devices 806. For example, in accordance with one particular embodiment of the invention which uses a device mapper, the device mapper, which preferably runs on server 804, locates all devices 806 connected to server 804. For each device 806 found, the device mapper allocates a dedicated TCP/IP port to it and saves the device-to-port association in a device-to-port map. When discover monitor applet 822 discovers all the devices 806 on the network, the device-to-port association is provided to DMA 822 from the device-to-port map located on server 804. The DMA 822 then uses the device-to-port association to send management commands to a particular device 806 connected to server 804.

FIG. 8 illustrates how discover-monitor applet 822 locates and communicates with devices (e.g., storage controllers) proxy connected to a network through a server. While not discussed herein, a similar procedure preferably is used to locate and communicate with devices direct attached to the network. However, as discussed above, the RPC-to-UTM agent server 810 is not needed in the network attached case because the network attached controller includes firmware for receiving and translating RPC commands directly.

Volume Creation

Referring now to FIG. 9, a flow diagram 900 is shown illustrating the steps of creating a new volume on a storage system. If a user wishes to create a new volume on a storage system, the user preferably selects the new volume option shown on the display screen (step 9A). Next, the management interface application 902 fetches a list of "volume candidates" from storage system controller 904. The storage system controller reports a list of volumes that can be created, given the current drive group configuration of the storage system (see step 9B). Management interface application 902 then displays the new volume candidates on display 906 to the user as "volume creation options" (step 9C). Next, the user picks and possibly customizes one of the volume creation options (step 9D). This "new volume specification" is supplied as an input to the management interface application 902. The management interface application 902 converts the new volume specification input by the user into a "create volume" command which can be understood by the storage systems controller 904 (step 9E). Controller 904 creates a new volume, and records that event in an array event log 908 (step 9F). As soon as the new volume is in a "committed", usable state, the "create volume" command returns to management interface application 902 (step 9G). The controller then reports a "configuration changed" event to listening clients (steps 9H and 9I). As flow diagram 900 illustrates, more than one management client may exist on the network. In the illustrated embodiment, there are two management clients, 902 and 910. However, any number of management clients may exist on the network.

When each of the clients 902, 910 receive the "configuration changed" event, clients 902, 910 preferably update their respective storage system screen displays 906, 912, showing that the new volume is in a state of "optimal-initializing" since, although usable, it does not have good parity (step 9J and 9K). Controller 904 then initiates parity initialization on the new volume. Since the new volume is reported as being in the "initializing" state, management clients 902, 910 display a progress bar for the parity initialization task on display devices 906, 912 (steps 9N and 9O). Clients 902 and 910 periodically request progress data from controller 904 and use that information to update the displayed progress bar (steps 9P and 9Q). When the parity initialization task completes, controller 904 transmits a "configuration changed" event to clients 902, 910, indicating that the new volume is in the "optimal" state (steps 9R and 9S). Clients 902 and 910 then indicate on display devices 906 and 912, respectively, that the parity initialization task is complete (steps 9T and 9U). Management clients 902, 910 may display the task complete status in a variety of ways, including advancing the progress bar to 100%, dismissing the progress bar or displaying a message that the task is complete.

Configuration Replication

Referring now to FIG. 10, a flow diagram 1000 is shown illustrating the process of replicating a storage system configuration from one storage system to another. To replicate the configuration of one storage system to another, a user preferably selects a source storage array and invokes a management interface application 1012 for that system (step 10A). Preferably, the user uses the discover-monitor applet 1010 running on management station 1002 to invoke the management interface application 1012. Next, the user selects a destination storage array which is to receive the source storage array's configuration, and invokes a management information application 1014 for that array (step 10B). Again, the user preferably uses the discover-monitor applet 1010 in management station 1002 to invoke the destination storage system's management interface application 1014. Next, the source storage system's management interface application 1012 preferably fetches the device configuration description for the source storage system from storage system 1004, and in particular, controller 1016 (step 10C), and writes it to file 1018 (step 10D).

In the next step, the destination storage system's management interface application 1014 is directed to "apply" the saved configuration description to the destination storage system 1006 (step 10E). In accordance with this aspect of the invention, destination storage system management interface application 1014 preferably displays a confirmation dialogue on display 1020 so that the user can confirm the application of the configuration description (step 10F).

To update destination storage system 1006 with the source storage system's configuration, the destination system 1006 first should be synchronized with the source storage system 1004 with respect to firmware sets. Thus, management interface application 1014 preferably retrieves the firmware that it needs for the destination device 1006 from a firmware repository 1022 residing on a web server 1008 or other suitable storage location (step 10H). The selected firmware is then loaded into the destination device 1006 and, in particular, controller 1024 (step 10I). Next, management interface application 1014 passes the rest of the configuration description to controller 1024 on destination device 1006 (step 10J). Upon receiving the configuration description, the destination device 1006 then reconfigures itself, issuing "config change" events and "new task" events as appropriate (step 10K).

Mass Operations

As one skilled in the art will appreciate, it may be preferably to perform a specific management task on a plurality of systems on a network. For example, instead of performing a configuration replication on a single system as discussed above with reference to FIG. 10, it may be desirable to perform the configuration replication on a plurality of devices at the same time. Thus, it is desirable to have an operation which can perform management functions on a plurality of devices at the same time. In accordance with the present invention, any particular management command can be performed as a mass operation on a plurality of devices. However, for illustration purposes, the mass operation model will be described herein as a mass configuration replication. However, the present invention is not limited to the specific example.

Referring now to FIG. 11, a flow diagram 1100 of a mass configuration replication operation is shown. To initiate the mass configuration replication operation, a user 1110 preferably utilizes a discover-monitor application 1112 running on management station 1102 to select a source storage system 1104 and launch a management interface application 1114 for the selected source storage system 1104 (steps 11A and 11B). Next, user 1110 preferably selects a "generate config file" or other similar task from management interface applications 1114 task menu (step 11C). Management interface application 1114 then will process the "generate config file" task by requesting and obtaining the configuration description of the source storage system 1104 from its controller 1116 (step 11D). Management interface application 1114 will then save the configuration description from the source storage system 1104 into a storage area 1118 (step 11E). In accordance with one particular embodiment of the invention, user 1110 may edit the configuration description in storage area 1118 (step 11F). The editing function may be performed using discover-monitor applet 1112, management interface application 1114, or another suitable editing application program which may reside on management station 1102.

After the configuration description is finalized, user 1110 preferably selects the mass operation function on discover-monitor applet 1112 (step 11G). Discover-monitor applet 1112 retrieves the configuration description from storage area 1118 (step 11H), and then loads from a second storage area 1120 a list of storage systems on the network which may be destination systems to receive the mass configuration operation (step 11I). Discover-monitor applet 1112 then displays the list of storage systems on the network on a display device 1122 (step 11J). User 1110 preferably selects the storage systems which it would like updated with the source configuration description (step 11K), and discover-monitor applet 1112 then launches management interface applications 1124-1 to 1124-N for each of the selected storage systems (step 11L). As with the configuration application process illustrated in FIG. 10 and discussed above, each of the management interface applications 1124 retrieves a firmware set from firmware repository 1128 in server 1108 or other suitable storage location (step 11M), and applies the controller firmware set to the controller 1126 of the appropriate destination device 1106 (step 11N). For example, management interface application 1124-1 preferably retrieves a firmware set and applies it to controller 1126-1 of destination storage system 1106-1 . Similarly, management interface application 1124-2 retrieves a firmware set and applies it to controller 1126-2 of destination device 1106-2, and so on.

After each of the controller firmware sets have been updated, each of the management interface applications 1124 send the configuration description to the destination devices 1106 and their controllers 1126 (step 1 1O). Controllers 1126 receive the configuration description, perform the configuration change operation(s) and then pass back "configuration" and "new task" events to the management interface applications 1124 (step 11P).

As one skilled in the art will appreciate, before a configuration change is implemented, error checking typically is performed to determine whether the destination device is compatible with the configuration description. That is, whether the particular hardware of the destination storage system can accept and implement the configuration set forth in the configuration description. In addition, the software in the controller should be checked to determine if it can perform the functions required to implement the configuration update. In accordance with this particular aspect of the invention, an error checking routine 1200 as illustrated in FIG. 12 may be used. Error checking routine 1200 preferably comprises a hardware check module 1202 which retrieves hardware configuration restraints from the configuration description 1204 (step 12A). In addition, hardware check module 1202 preferably retrieves the target or destination hardware configuration 1206 from the destination hardware device (step 12B). Hardware check module 1202 then performs a check to determine whether the hardware target configuration is compatible with the configuration restraints from configuration description 1204. That is, hardware check module 1202 determines whether the target or destination hardware device can be configured according to the hardware configuration restraints. If not, hardware check module 1202 displays an error message on a display 1208 (step 12C). If there is no error, the error check routine moves on to software check module 1210 (step 12D).

Software check module 1210 preferably retrieves the configuration specification 1212 from configuration description 1204 (step 12E), as well as the destination device's software version specific rules 1214 (step 12F). The destination device's software version specific rules preferably set forth the functions which the destination device's software can perform. If the device's software version cannot perform a particular configuration update, software check routine 1210 displays an error on display 1208 (step 12G). If the software can perform the configuration change, the error routine moves on to the apply configuration module 1216 (step 12H). Apply configuration module 1216 preferably retrieves the configuration specification 1212 from description 1204 (step 12I) and uses it to perform the configuration change (step 12J). Preferably, the apply configuration module 1216 comprises the discover monitor applet, management interface applications, and other management application programs discussed above with reference to FIGS. 9, 10 and 11 above.

While the error routine set forth in flow diagram 1200 is described in the context of a configuration replication example, one skilled in the art will appreciate that the error routine or a similar error routine may be performed on any mass operation management function. In addition, the error routine set forth in FIG. 12 and described herein may be performed on other non-mass operation management functions, such as the volume creation example illustrated in FIG. 9 and the configuration replication example illustrated in FIG. 10.

Event Reporting

Referring now to FIG. 13, a flow diagram 1300 is shown illustrating the process of a managed device reporting events to a management station. To begin an event reporting/monitoring session of a proxy attached storage system or device, a management station (not shown) preferably sends a "connect" command to server 1302 and more specifically to RPC-to-UTM agent server 1306 (step 13A). After receiving the "connect" command, RPC-to-UTM agent server 1306 preferably creates an RPC-to-UTM agent thread 1308 to service the connection (step 13B). In accordance with a preferred embodiment of the present invention, the RPC-to-UTM agent thread preferably is a dedicated hanging asynchronous event notification (AEN) listener.

Once the RPC-to-UTM agent thread is started, the management station preferably issues an RPC command, such as a "GetConfigChangeInfo" command or the like to the RPC-to-UTM agent thread 1308 (step 13C). RPC-to-UTM agent thread 1308 converts the "GetConfigChangeInfo" RPC packet or other suitable command packet into a UTM buffer and forwards it on to storage system 1304 as a UTM transaction (step 13D). Preferably, storage system 1304 includes a controller 1310 and a UTM-to-internal-messaging component 1312. As one skilled in the art will appreciate, UTM-to-internal-messaging component may be a process for run within controller 1310. UTM-to-internal-messaging component 1312 preferably receives the "GetConfigChangeInfo" command via UTM and starts a hanging AEN event 1314 (step 13E).

The hanging AEN event is an event 1314 which waits for an event notification from the storage system before any status is returned to server 1302, and the management station. When an event within storage system 1304 occurs, controller 1310 delivers an event notification to UTM-to-internal-messaging component 1312 (step 13F). When the event notification is received, UTM-to-internal-messaging component 1312 configures the event notification information into a suitable UTM packet and retrieves the "GetConfigChangeInfo" call from its hanging status (step 13G). UTM-to-internal-messaging component 1312 then returns the event notification information as a UTM packet or buffer 1316 to the RPC-to-UTM agent 1308 (step 13H). The AEN listener in RPC-to-UTM agent 1308 extracts the event information from the UTM buffer 1316 (step 13I), and then writes the event information to a RPC message buffer 1318 (step 13J). RPC-to-UTM agent 1308 then returns the "GetConfigChangeInfo" RPC function to the management station along with the event notification information in buffer 1318 (step 13K). After processing the event notification information, the management station sends another "GetConfigChangeInfo" function call in order to start the event notification process again (step 13L). Again, the RPC-to-UTM agent 1308 then sends the "GetConfigChangeInfo" command in UTM format to UTM-to-internal messaging component 1312 in storage device 1304 (step 13M). The hanging AEN event will then initiate until another notification occurs.

The event notification example illustrated in FIG. 13 and disclosed herein refers to a "GetConfigChangeInfo" command issued by the management station. One skilled in the art will appreciate that the "GetConfigChangeInfo" command is merely an example of a specific command that may be used and that any other suitable command which server 1302 and storage system 1304 can interpret as a command to begin the event notification process can be used. In addition, the example illustrated in FIG. 13 is an event notification example for a proxy attached storage system connected to a network through a server. A similar event notification process can be used with a network attached storage system, except that instead of the RPC command first being converted to UTM before being sent to the storage system, the network attached storage system will receive the "GetConfigChangeInfo" command in RPC form from the management station and processors it accordingly. That is, a RPC-to-internal messaging component receives the command and starts the managing AEN event.

Configuration Update Notification

In accordance with a preferred embodiment of the present invention, when a managed entity, such as a storage system or other suitable I/O device on a network undergoes a configuration change, it is preferable that the configuration change for that managed device is broadcast to all management entities on the network. As discussed above, a given network can have a number of management entities such a one or more management stations in accordance with the present invention, as well as DMI, SNMP or other third party management stations. Thus it is preferable to have a system and a method in which a managed entity can notify all management entities on a system of a configuration change. In accordance with this preferred aspect of the present invention, a flow diagram 1400 is shown illustrating a process in which a managed entity 1404 informs all management entities 1402 on a system of configuration changes.

As discussed above, a role of the management entity 1402 is to keep and maintain an internal representation of the state of managed entities 1404 on the system. This internal representation of a managed entity 1404 is referred to as an "object graph." Management entity 1402 builds the object graph by importing state information from managed entity 1404. In accordance with a preferred embodiment of the invention, when the configuration of a managed entity 1404 changes, the managed entity 1404 preferably transmits an entirely new object graph to management entity 1402. Management entity 1402 then uses the new object graph to update the visual representation of the managed entity on a display screen.

In accordance with an alternative embodiment of the present invention, instead of transmitting entirely new object graphs to management entity 1402 when a configuration changes, management entities 1404 preferably update the object graphs in management entity 1402 by transmitting call back deltas. These deltas specify the specific part(s) of the object graph which have changed, so that as small changes to the object graph are made, only the information about the small changes to the object graph are sent to management entities 1402, not completely new objects graphs. This allows the object graph changes to be localized, and thus, state information transfers minimized.

For example, as discussed above with reference to FIGS. 9–13, when a management interface application is run for a particular managed device or entity, such as a storage system, the object graph of that storage system or managed entity is typically displayed on the management station. When changes to the managed entity are performed by a management station, such as volume creation (FIG. 9) or configuration changes (FIGS. 10–12), the new configuration information typically is transmitted back to the management station requesting that change when the configuration change is complete. However, in accordance with this particular aspect of the present invention, it is preferable that the updated object graph deltas are independent from the configuration change requests. That is, when a management station issues a configuration change command, it does not wait for the command to finish before performing other tasks. Instead, the management station preferably issues an event notification session as discussed above with reference to FIG. 13, and receives object graph update deltas via that path. In addition, all other management stations also will have event notification sessions running, so that they also will receive the object graph update deltas when the updates occur. In this manner, all management stations are updated with configuration change information as the changes occur or shortly thereafter. In addition, the management station issuing the change request is not held-up, waiting for the change to occur.

As illustrated in FIG. 15, a process flow 1500 of a management entity sending configuration change commands and receiving configuration change notification information is illustrated. In accordance with this aspect of the present invention, the management entity preferably includes a user interface 1502, which allows a user to visualize the configuration and status of the managed devices on the system, as well as issue management commands such as volume changes, configuration changes, and/or error recovery commands, to name a few. To visualize the configuration and status of a particular managed device, user interface 1502 displays an object graph 1504 of the particular managed device. When a user wishes to change the configuration of a particular managed device, the user, using interface 1502, preferably issues one or more configuration change commands from a command issuer 1506. As illustrated in FIG. 15, when command issuer 1506 issues a configuration change or error recovery command, it does not wait to receive the configuration change information from the managed device. Instead, the management entity preferably includes an event notification receiver 1508, which is configured to receive that information. When the managed device's configuration is updated, the managed device issues update notifications to all management entities on the system/network. The management entities receive these notifications via event notification receiver 1508. As discussed above, the update notifications from the managed devices may comprise entirely new object graphs from the managed devices, or the update notifications may be configuration deltas which merely reflect the change in the configuration.

Long-Term Operations

When performing configuration altering commands to a managed device such as a storage system or the like, two models of completion are common. The first model involves a command which only takes a short time to complete. With this model, the storage system controller can return status of the short-term configuration request to the requester, as well as other management devices in a system in near real time. The second model, however, involves a request that requires an extended time to complete. For example, a complete reformat or re-layout of data on a storage system. The problem with an extended time to complete type request is that the user expects to see a progress indication of the command request to avoid uncertainty of a "hung" system. However, if a management station thread is left open to monitor the progress of the long term event, resources may be wasted because a management station thread is hung-up monitoring the status of the long-term command. Thus, in accordance with the present invention, systems and methods are provided in which typically long-lived operations are turned into short-term events.

In a typical transaction model for storage arrays, a management station will not be freed until the storage array "commits" a particular request or transaction. When a storage system commits a transaction, the transaction typically is "durable". A durable transaction means that the storage system guarantees that subsequent faults or interruptions on the storage system will not affect the results of the transaction. However, in accordance with the present invention, just because a particular transaction is durable does not mean that the storage system has finalized processing of the transaction, and thus, updated its configuration. As one skilled in the art may appreciate, a transaction can commit early, but the transaction may still have residual activities that go on within the storage system after the storage array has committed the transaction. These residual activities do not affect object durability, but may affect object state. That is, the transaction request may be durable, but the storage system reconfiguration may not be complete.

Referring now to FIG. 16, a flow diagram 1600 is shown illustrating a method of processing long-lived operations. In accordance with flow diagram 1600 in FIG. 16, a host or a management station preferably issues a long-lived operation request, such as a storage system drive reconfiguration, or the like, to a managed device's controller (step 1602). In accordance with this example, the managed device preferably is a storage system. However, any suitable managed device on a network may perform the long-lived processing operation of the present invention.

After the management station issues the long-lived operation request, the controller of the storage system receives the request (step 1604), processes the request, and makes necessary state changes to make the long-lived operation "durable" (step 1606). While the storage system controller is processing the request, and making the operation durable, the management station preferably waits for a response from the controller indicating that the request is durable (step 1608). After the long-lived operation is durable in the storage system controller, the controller preferably returns status to the management station (step 1610). The management station receives the return status as complete (step 1612) and displays a status complete dialogue to the user requesting the long-lived operation (step 1614).

In accordance with the present invention, even though storage system controller returns status as complete, the complete status only indicates that the long-lived operation is durable within the controller. It does not mean that the actual long-lived operation has completed. Thus, the controller continues to process the long-lived operation (step 1616) and send status updates of the operation to the management station or host (step 1618). The management station receives the status updates and preferably updates the completion status dialogue object displayed on the screen of the management station (step 1620). Steps 1618 and 1620 continue until the long-lived operation completes. Once the long-lived operation completes, the storage system controller sends a completion message to the management station (step 1622). Upon receiving the completion message from the controller, the management station notifies the user that the operation is complete (step 1624). The management station may inform the user that the operation is complete in a number of ways, including showing the completion status percentage as 100%, issuing a dialogue stating that the operation is complete, or ending the process. In any event, any particular status completion message may be used.

Even though in step 1620 the management station receives status updates, and updates the completion status dialog on the management station screen, the management station is not frozen while waiting for the completion of the long-lived operation. That is, even though the management station displays the status information, a user may perform other tasks with the management station while the long-lived operation is processing. In addition, once the management station receives the message that the long-lived operation is "durable" even if the storage system fails, for example, due to power loss or some other mechanical error, the long-lived operation will be processed when the failed device is brought back on-line. In this matter, once an operation is made durable, the management station preferably does not ever have to issue the long-lived operation request again, regardless of what happens to the controller.

Conclusion

In conclusion, the present invention provides methods and apparatus for managing I/O devices on a network. While a detailed description of presently preferred embodiments of the present invention have been given above, various alternatives, modifications and equivalents will be apparent to those skilled in the art. For example, while most of the examples given herein refer to storage systems, any suitable I/O device residing on a network may be managed using the methods and apparatus of the present invention without varying from the spirit of the invention. In addition, while preferred embodiments of the present invention are disclosed herein as using Java applets and Java compliant browsers or run-time environments to process the Java applets, any suitable computer language and processing environment may be used. Therefore, the above description should not be taken as limiting the invention which is defined by the appended claims.

What is claimed is:

1. A system for monitoring and managing devices on a network, comprising:

a proxy server connected to said network;

a managed device connected to said proxy server via a communication connection;

storage means for storing a device management application program associated with said managed device; and a management station in communication with said managed device via said proxy server and in communication with said storage means, said management station configured to retrieve said device management application program from said storage means and process said device management application program;

wherein the processing of said device management application program by said management station allows said management station to monitor and manage said managed device;

wherein said managed device includes a controller for controlling said managed device, and wherein the processing of said device management application program by said management station allows said management station to send management commands to said controller via said proxy server;

wherein said proxy server comprises routing means for receiving commands from said management station and routing said commands to said controller of said managed device;

wherein said device management application program communicates with said proxy server using a first communication protocol, and said proxy server communicates with said managed device using a second communication protocol, and wherein said proxy server comprises a protocol converter for converting communication messages directed from said device management application program to said managed device from said first communication protocol to said second communication protocol, and for converting communication messages directed from said managed device to said device management application program from said second communication protocol to said first communication protocol; and wherein said first communication protocol is remote procedure call (R-PQ and said second communication protocol is universal transport mechanism (UTM), and wherein said protocol converter comprises an RPC-to-UTM conversion application.

2. A method for managing devices connected to a proxy server, comprising the steps of, (a) providing a proxy server connected to a network;

(b) providing a management station for managing one or more managed devices connected to said proxy server;

(c) said management station locating said proxy server on said network;

(d) said management station obtaining from said proxy server a list of said one or more managed devices connected to said proxy server;

(e) displaying said one or more managed devices connected to said proxy server on a display associated with said management station;

(f) selecting one of said one or more managed devices to be managed;

(g) retrieving a management application program associated with said selected one of said one or more managed devices form a storage means;

(h) running said retrieved management application program on said management station;

(i) sending management commands from said management station to said selected one of said one or more managed devices via said proxy server;

wherein said management station communicates with said proxy server with a first communication protocol and said proxy server communicates with said selected one of said one or more managed devices with a second communication protocol, (j) said proxy server converting said management commands form said management station form said first communication protocol format to said second communication protocol format;

(k) said proxy server sending said management commands to said selected one of said one or more managed devices in said second communication protocol format;

wherein said first communication protocol is remote procedure call (RPC) and said second communication protocol is universal transport mechanism (UTM).

* * * * *